United States Patent Office 3,594,435
Patented July 20, 1971

3,594,435
LARGE RING POLY-ENE COMPOUNDS HAVING TRANS CONFIGURATION AND METHOD FOR THEIR PRODUCTION
Hisao Kondo, Masaki Nishino, and Akihisa Miyake, Kamakura-shi, Japan, assignors to Toray Industries, Inc., Tokyo, Japan
No Drawing. Filed Feb. 10, 1969, Ser. No. 798,176
Claims priority, application Japan, Feb. 9, 1968, 43/7,768; Oct. 31, 1968, 43/78,867
Int. Cl. C07c 3/10, 13/02
U.S. Cl. 260—666        8 Claims

ABSTRACT OF THE DISCLOSURE

Cyclic compounds having one of the following formulas:

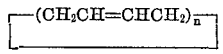

or

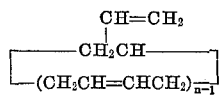

are described, where $n$ is an integer not less than 4, and the unsaturations of said compounds exhibit trans configurations. These compounds are produced by a process comprising reacting butadiene in the presence of both a nickel-hydrogen coordination complex and a halogenated nickel-hydrocarbon coordination complex.

BACKGROUND OF THE INVENTION (1) Field of the invention

The present invention relates to novel large ring poly-ene hydrocarbon compounds and a process for the preparation thereof. More particularly it relates to the preparation of oligomers (e.g. tetramers, pentamers, hexamers, heptamers, octamers, nonamers) of butadiene, that are ring compounds having all trans unsaturations.

(2) Description of the prior art

It is known to dimerize or trimerize butadiene to produce, respectively, 1,5-cyclooctadiene or 1,5,9-cyclododecatriene. Moreover two references have been made to a cyclohexadecatetraene compound. In H. W. B. Reed, J. Chem. Soc. 1954, 1931, it is described that a small amount of a tetramer of butadiene showing a refractive index of $n_D^{20} = 1.5472$ is produced by reacting butadiene in the presence of Ni(PPh$_3$) (CO)$_2$ catalyst, and that such product is a cyclohexadecatetraene. In German Pat. No. 1,050,-333, it is stated that a very small amount of cyclohexadecatetraene is produced as a by-product when butadiene is reacted in the presence of TiCl$_4$-Et$_2$AlCl catalyst. Trimerization of butadiene with a "naked" nickel catalyst has produced 1,5,9-cyclododecatriene, and a catalyst consisting of a "naked" nickel and phosphine has been used to successfully dimerize butadiene.

SUMMARY OF THE INVENTION

It is an object of this invention to provide a class of novel large ring poly-ene compounds, and particularly such compounds having all transconfiguration. Another object of the present invention is to provide a process for preparing such novel compounds by the oligomerization of butadiene, and particularly the provision of hydrocarbon ring molecules of at least 14 carbon atoms in the ring. We have now discovered the class of compounds having the following structural formula:

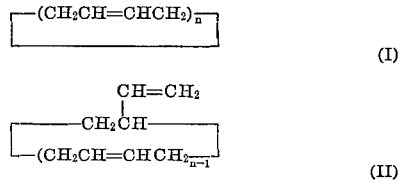

where $n$ is an integer not less than 4. These novel compounds of his invention are provided by the novel process of this invention which comprises reacting butadiene in the presence of both a "naked" nickel catalyst and a halogenated "naked" nickel catalyst. The normal product of this process is a mixture of such compounds according to either of said formulae, with the $n$ of most compounds of the mixture being greater than 4 and less than 9. The unsaturations of all products of this process have trans configurations.

A "naked" nickel is known to be a coordination compound of a nickel atom and a hydrocarbon ligand which is excluded in the presence of butadiene (cf. G. Wilke et al., Angew, Chem. 78,157, 1966). For instance, the trimerization of butadiene by a nickel catalyst is represented by the following equation:

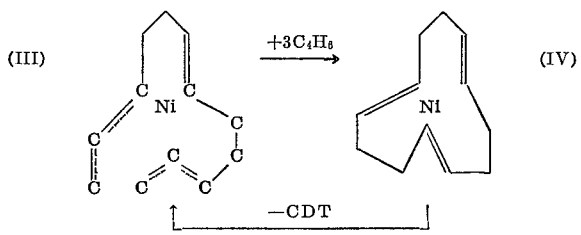

According to this equation, nickel in the presence of butadiene forms the two complexes shown, complex (IV) at temperatures higher than room temperature, and otherwise complex (III), which represents the exclusion of cyclododecatriene (CDT).

Among the other "naked" nickels which are capable of being isolated are diallyl nickel; bis(substituted allyl) nickel, such as dimethallyl nickel, dicrotyl nickel, dicyclohexenyl nickel, bis(triphenylmethyl) nickel, bis(benzyl) nickel, or bis(cyclooctadiene) nickel, without limitation.

Such "naked" nickel compounds may be produced, for example, by reacting nickel compounds, such as nickel acetylacetonate, C$_8$H$_{13}$Ni - acetylacetonate, C$_3$H$_5$NiX (where X is Cl, Br or I) and NiX$_2$ (where X is Cl, Br or I) in butadiene and with organoaluminum compound of either of general formulae R$_3$Al and R$_2$AlOR' (where R and R' denote a hydrocarbon radical), for example triethyl aluminum, triisobutyl aluminum or ethoxydiethyl aluminum; a Grignard reagent, RMgX (where R represents a hydrocarbon radical and X represents Cl, Br or I), for example phenyl magnesium bromide, cyclohexyl magnesium chloride, ethyl magnesium bromide and isopropyl magnesium chloride; an alkali metal per se; or a reducing agent containing an alkali metal, such as butyl lithium, phenyl lithium and lithium aluminum hydride.

Likewise, halogenated "naked" nickel is a monohalogenated coordination compound of nickel atom and a hydrocarbon ligand. Halogenated "naked" nickel complexes which have been isolated are, for example, allyl nickel chloride (C$_3$H$_5$NiCl), allyl nickel bromide (C$_3$H$_5$NiBr), allyl nickel iodide (C$_3$H$_5$NiI), methallyl nickel chloride, methallyl nickel bromide, methallyl nickel iodide, crotyl nickel bromide, cyclooctadiene nickel bromide, cyclooctadiene nickel iodide, triphenylmethyl nickel chloride and triphenylmethyl nickel bromide.

Various methods may be used to synthesize halogenated "naked" nickels. For instance, a "naked" nickel as hereinbefore described may be reacted with a mol equivalent of hydrogen halide or one half mol of a halogen. Also such a "naked" nickel may be reacted with an allyl halide or an organic halide of the general formula RX, and RCOX, where R represents a hydrocarbon radical and X represents Cl, Br or I. Allyl nickel chloride may be synthesized by the reaction of nickel carbonyl with allyl chloride. As a further process of preparing a monohalogenated "naked" nickel, there is the reaction in butadiene of an effective amount of a dehalogenation agent such as sodium, RLi, RMgX, $R_3Al$ or $R_2AlOEt$ (where R is a hydrocarbon radical, X is Cl, Br or I, and Et is an ethyl radical) on a dihalogenated nickel ($NiX_2$).

In accordance with the process of this invention, the "naked" nickel and the halogenated "naked" nickel need not be used in isolated states, but one or the other, or both, may be prepared in situ in butadiene. Examples of some general reactions of this nature are as follows:

(1) The process of mixing an isolated "naked" nickel with an isolated halogenated "naked" nickel in butadiene, e.g. diallyl nickel is mixed with allyl nickel chloride in butadiene.

(2) The process of adding an isolated "naked" nickel to butadiene, and then further adding a hydrogen halide and an allyl halide thereto to convert a part of the "naked" nickel to a halogenated "naked" nickel, e.g. adding cyclododecatriene nickel, and then further adding ½ mol equivalent of triphenylmethyl chloride thereto.

(3) The process of adding an isolated halogenated "naked" nickel to butadiene and then converting a part of the former to a "naked" nickel, e.g. adding allyl nickel chloride to butadiene, and thereafter blowing in about two mol equivalents of ammonia thereto to convert a part of the allyl nickel chloride to diallyl nickel.

(4) The process of producing a "naked" nickel and a halogenated "naked" nickel in butadiene, e.g. adding 1.5 mol equivalents of butyl lithium to anhydrous nickel chloride in butadiene.

The reaction of the present invention takes place unexpectedly by mutual action of a "naked" nickel and a halogenated "naked" nickel. When a "naked"' nickel only is used as a catalyst, only cyclododecatriene is produced, and when a halogenated "naked" nickel only is used as a catalyst, only poly-1,4-butadiene is produced. Moreover, in both cases, a large ring poly-ene is not produced.

While broadly speaking, the ligand of the nickel complexes used in accordance with the process of this invention may be any hydrocarbon moiety, a hydrocarbon moiety as a ligand of not more than 20 carbon atoms is preferred. Such ligands having olefinic double bonds are especially preferred.

The large ring poly-enes represented by the structural Formulae I and II obtained by the process of the present invention are all novel compounds, since all the double bonds within the ring have trans configurations. The refractive index of the novel compound in accordance with this invention trans, trans, trans, trans-1,5,9,13-cyclohexadecatetraene is $n_D^{20}=1.5057$, which is remarkably different from the refractive index $n_D^{20}=1.5472$ of the earlier disclosed cyclohexadecatetraene. Accordingly, the earlier compound is not the trans, trans, trans, trans-1,5,9,13-cyclohexadecatetraene obtained in the present invention.

The process of German Pat. No. 1,050,333 has been carried out by your inventors, with the result that a small amount of a three component butadiene tetramer was produced (A,B,C). Gas chromatographic analysis showed that none of these components are in accord with the structure of a compound of the present invention.

Compounds in accordance with the present invention up to and including nonamers have been isolated and physical properties thereof measured. However, by gel permeation chromatography the decamer, undecamer, dodecamer . . . vigesimer can be clearly detected, and there is no doubt that ring oligomers of more than these is obtainable.

In the catalytic process of the present invention, there is no critical limitation of the ratio of a "naked" nickel and a halogenated "naked" nickel, however, in order to provide as large a yield of large ring polyene as possible, it is preferable to use a halogenated "naked" nickel in an amount within the range of from about 0.1 to about 10 mols, and most preferably from about 0.3 to about 3 mols, based on 1 mol of a "naked" nickel. Likewise there is no critical limitation with respect to the ratio of "naked" nickel to butadiene, however, normally a so-called catalytic amount should be used, especially an amount within the range of from about 0.0001 to about 0.1 mol based on 1 mol of butadiene is preferred.

During the reaction of butadiene, a solvent may be optionally used, and when used, aliphatic or aromatic hydrocarbon solvents such as hexane, pentane, benzene and toluene, as well as ethers such as diethylether and tetrahydrofuran may be cited as examples. The reaction temperature may be within the range of from about 0° to about 100° C., however, preferably the reaction is carried out at a temperature within the range of from about 10° to about 50° C. The thus obtained large ring polyenes of this invention, e.g. when converted to a ketone by conventional processes may be utilized as a perfume and may also be readily converted into α,ω-dicarboxylic acids by ring opening and oxidation.

DESCRIPTION OF THE PREFERRED EMBODIMENTS

EXAMPLE 1

To 131 g. of butadiene, were added 10 cc. of an ether solution of 0.71 g. of diallyl nickel, and 14 cc. of an ether solution of 0.72 g. of allyl nickel chloride, and the mixture was stirred and reacted at 20–25° C. for 4 days. After recovering the unreacted butadiene, the reaction liquid was added to 500 g. of acetone to divide the mixture into a polymer portion and an acetone-soluble portion, as follows:

|  | G. |
|---|---|
| Unreacted butadiene | 37.4 |
| Acetone-soluble portion | 81.5 |
| Polymer | 10.4 |

The acetone-soluble portion was distilled to separate to the following components.

|  | G. |
|---|---|
| B.P. 25° C.–60° C./1.5 mm. Hg | 22.4 |
| B.P. 60° C.–250° C./10⁻³ mm. Hg | 45.9 |
| B.P. 250 C.– /10⁻³ mm. Hg | 10.1 |

As a result of analyzing each fraction by gas chromatography, it was known that the following products were obtained.

|  | G. |
|---|---|
| 4-vinyl-1-cyclohexene (VCH) | 0.40 |
| 1,5-cyclooctadiene (COD) | 2.40 |
| 1,5,9-cyclododecatriene | 11.7 |
| 1,5,9,13-cyclohexadecatetraene (CHDT) | 6.75 |
| 12-vinyl-1,5,9-cyclotetradecatriene (VCTT) | 1.12 |
| 1,5,9,13,17-cycloeicosapentaene (CECP) | 10.78 |
| 16-vinyl-1,5,9,13-cyclooctadecatetraene (VCOT) | 2.14 |
| 1,5,9,13,17,21-cyclotetracosahexane (CTCH) | 9.67 |
| 20 - vinyl - 1,5,9,13,17 - cyclodocosapentaene (VCDP) | 3.74 |
| 1,5,9,13,17,21,25 - cyclooctacosaheptaene (COCH) | 4.56 |
| 24 - vinyl - 1,5,9,13,17,21 - cyclohexacosahexaene (VCHH) | 1.70 |
| 1,5,9,13,17,21,25,29 - cyclodotriacontooctaene (CDTO) | 3.60 |
| 28-vinyl-1,5,9,13,17,21,25 - cyclotriacontaheptaene (VCTH) | 1.91 |
| 1,5,9,13,17,21,25,29,33-cyclohexatriacontanonaene (CHTN) | 2.13 |

G. 32 - vinyl-1,5,9,13,17,21,25,29-cyclotetratriacontaoctaene (VCTO) _____ 1.00

The entire yield of CHDT through VCTO was about 53.3%.

A white polymer obtained by the treatment with acetone which had an average molecular weight of about 1500 was identified as trans-1,4-polybutadiene by infrared absorption spectrum, analysis.

A viscous polymer which was a residue of the distillation had an average molecular weight of about 650 and it was identified as trans-1,4-polybutadiene by infrared absorption spectrum analysis.

A confirmation of structures of CHDT through VCTO was carried out as follows.

Confirmation of structures of CHDT and VCTT

A mixture of the $C_{16}$ component through the $C_{36}$ components was distilled, and a fraction of B.P. 90°–100° C./1 mm. Hg taken out. A further rectification of this fraction gave components of CHDT and VCTT only. When this $C_{16}$ component was treated with an aqueous solution of saturated silver nitrate, white crystals were obtained. The mixture was filtered to separate crystals and a filtrate. While crystals were recrystallized twice from ethanol to obtain crystals of a pure composition corresponding to the formula $C_{16}H_{24}AgNO_3$, having a melting point of 167–169° C.

*Elementary analysis.*—Calculated value as $C_{16}H_{24}AgO_3$ (percent): C, 49.75; H, 6.26. Analyzed value (percent): C, 49.78; H, 6.11.

When to said crystals ammonia was blown in water and extracted with n-pentane, pure $C_{16}H_{24}$ was obtained. M.P. 19–20° C., B.P. 106–107° C./3 mm. Hg; $n_D^{20}=1.5057$ (purity: 100).

*Elementary analysis.*—Calculated value as $C_{16}H_{24}$ (percent) C, 88.87; H, 11.15. Analyzed value (percent): C, 88.82; H, 11.18.

From measuring the mass spectrum, the molecular weight was found to be 216. A nuclear magnetic resonance spectrum showed absorption at $4.8\tau$ derived from hydrogen on carbon, constituting a double bond, and at $7.99\tau$ derived from methylene hydrogen at the allyl position only. The strength ratio of the two was 1:2, from which it was recognized that this compound was 1,5,9,13-cyclohexadecatetraene. When this compound was hydrogenated in the presence of a catalyst of Pd-carbon, it absorbed 4 mols of hydrogen to give crystals having a molecular weight of 224 (corresponding to that of $C_{16}H_{32}$) and a melting point of 59–61° C. which was in accord with the melting point of a known compound, cyclohexadecan (M.P. 60–61° C.). Infrared absorption spectrum analysis of said 1,5,9,13-cyclohexadecatetraene showed absorption at 960 cm.$^{-1}$ and all double bonds of said compound were trans.

Through a filtrate obtained by treating the $C_{16}$ component with silver nitrate, ammonia was passed and said filtrate was extracted with n-pentane. Because the hydrocarbon extract obtained here was still a mixture of compounds, it was rectified to give a liquid having a B.P. 100–102° C./3 mm. Hg. Said compound had a molecular weight of 216 and analysis by a nuclear magnetic resonance spectrum showed absorption at $4.72\tau$ (6H), $5.13\tau$ (2H), $7.97\tau$ (12H) and $8.63\tau$ (2H). From the fact this compound had a methylene radical not adjacent to a double bond and a hydrogen at the vinyl position, it was obvious that it had a vinyl radical. Analysis by infrared absorption spectrum showed absorption at 1670 cm.$^{-1}$, 1643 cm.$^{-1}$, 990 cm.$^{-1}$, 960 cm.$^{-1}$ and 910 cm.$^{-1}$, supporting the aforemetnioned inference of vinyl function. Also, it is obvious from the number of hydrogens of the nuclear magnetic resonance spectrum that this compound was 12-vinyl-1,5,9-cyclotetradecatriene (VCTT). When this compound was hydrogenated using Pd-carbon it absorbed 4 mols of hydrogen, and this product on analysis by mass spectrum showed a molecular weight of 224 and it had a strong fragment peak at 224–29 from which it was known that this compound was ethyl cyclotetradecane having one ethyl radical.

All the double bonds inside the ring of the 12-vinyl-1,5,9 - cyclotetradecatriene (VCTT) compound were trans: $n_D^{20}=1.5004$ (purity: 93%).

Confirmation of structures of CECP and VCOT

A mixture of the $C_{16}$–$C_{36}$ components was distilled. A fraction of B.P. 130–145° C./1.5 mm. Hg was taken out, and the mixture was agaInt rectified to give the $C_{20}$ component only. Because the $C_{20}$ component did not produce a complex crystallizable with silver nitrate, the separation of CECP from VCOT was carried out by repeated rectification, by which a mixture of two components, namely, B.P. 147–150° C./1.0 mm. Hg and B.P. 142–144° C./1.0 mm. Hg was obtained.

B.P. 147–150° C./1.0 mm. Hg component: This component had a molecular weight of 270 (corresponding to that of $C_{20}H_{30}$) from mass spectrum analysis, and by nuclear magnetic resonance spectrum showed absorption strength ratio of 2:1 at $7.93\tau$ and $4.67\tau$, and when it was hydrogenated it absorbed 5 mols of hydrogen to give crystals having a molecular weight of 280, whose melting point was 59–60° C. which was in accord with the melting point of a known compound, cycloeicosane (M.P. 59° C.). When this compound, was oxidized with ozone, it gave 1,4-butanedial only.

From the foregoing it was known that this component was 1,5,9,13,17-cycloeicosapentaene (CECP). Infrared absorption spectrum analysis showed absorption at 960 cm.$^{-1}$, from which it was known that all the double bonds inside the ring were trans: $n_D^{20}=1.5133$ (purity: 98.4%).

B.P. 142–144° C./1.0 mm. Hg component: This component had a molecular weight of 270 ($C_{20}H_{30}$) from mass spectrum analysis, showing absorption at $4.72\tau$ (8H), $5.13\tau$ (2H), $7.97\tau$ (6H) and $8.63\tau$ (2H) by measuring by nuclear magnetic resonance spectrum, showing absorption at 990 cm.$^{-1}$, 960 cm.$^{-1}$ and 910 cm.$^{-1}$ by measuring by infrared absorption spectrum, from which it was known that it was a compound having a vinyl radical. When this compound was hydrogenated in the presence of a catalyst of Pd-carbon, it absorbed 5 mols of hydrogen to give a compound having a molecular weight of 280 and mass spectrum analysis of said compound showed a peak indicating existence of an ethyl radical, from which it was known that said product compound was ethyl cyclooctadecane.

From the foregoing, said component was obviously 16 - vinyl - 1,5,9,13 - cyclooctadecatraene (VCOT): $n_D^{20}=1.5093$ (purity: 95.5%).

Confirmation of structures of CTCH and VCDP

A mixture of the $C_{16}$ component through $C_{36}$ components was distilled, a fraction of B.P. 140–155° C./0.005 mm. Hg was taken out, and further rectification gave the $C_{24}$ component only.

This $C_{24}$ component was treated with an aqueous solution of saturated silver nitrate to give white crystals, which were filtered to separate the crystals from the filtrate. When the crystals were recrystallized from ethanol, a complex having a composition of $C_{24}H_{36}3AgNO_3$ (M.P. 167–9° C.) was obtained. To said crystals in water solution, ammonia was blown in and when the mixture was extracted with n-pentane, a pure $C_{24}H_{36}$ compound was obtained.

B.P. 159–60° C./0.02 mm. Hg; $n_D^{20}=1.5133$ (purity: 100%).

From mass spectrum analysis, it was known that the compound had a molecular weight of 324 (corresponding to that of $C_{24}H_{36}$). Nuclear magnetic resonance spectrum analysis showed absorption at strength ratio of 2:1 of $7.97\tau$ and $4.71\tau$, respectively. Further when this compound was hydrogenated in the presence of a catalyst of Pd-carbon, it gave crystals having a molecular weight of 336 (corresponding to that of $C_{24}H_{48}$), whose melting point was 47–8° C. which was in accord with the melting point of a known compound, cyclotetracosane (M.P. 48° C.), from which it was known that this component was the compound 1,5,9,13,17,21 - cyclotetracosahexaene (CTCH). Oxidation of the compound with ozane gave 1,4-butandial only. In infrared absorption spectrum, this compound had absorption at 965 cm.$^{-1}$, from which it was known that all the double bonds are trans.

Into the filtrate after treatment with silver nitrate, ammonia was passed, and when the filtrate was extracted with n-pentane and distilled, a $C_{24}$ component was obtained, however said component contained about 25% of CTCH. When silver nitrate was added little by little to said component, CTCH selectively disappeared and when CTCH completely disappeared, said component was extracted with n-pentane, and another $C_{24}$ component was obtained as follows:

B.P. 140–142° C./0.005 mm. Hg; $n_D^{20}$=1.5098 (purity: 98%).

From mass spectrum analysis this $C_{24}$ component had a molecular weight of 324, and in nuclear magnetic resonance spectrum it showed absorption at $4.70\tau$ (10H), $5.15\tau$ (2H), $7.97\tau$ (2H) and $850\tau$ (2H); and in infrared absorption spectrum it showed absorption at 900 cm.$^{-1}$, 965 cm.$^{-1}$ and 910 cm.$^{-1}$, which absorption is almost same as those of VCTT and VCOT. When said component was hydrogenated it absorbed 6 mols of hydrogen, becoming a compound having a molecular weight of 336. From mass spectrum analysis, it was understood that one ethyl radical existed, from which it was known that said compound was ethylcyclodocosane. From the foregoing experimental evidence this $C_{24}$ compound was 20-vinyl-1,5,9,13,17-cyclodocosapentaene (VCDP), all the double bonds inside the ring being trans.

Confirmation of structures of COCH and VCHH

A mixture of the $C_{16}$ component through $C_{36}$ components was distilled, a fraction of B.P. 185–198° C./0.02 mm. Hg being taken out and upon further rectification gave a $C_{28}$ component only. As a result of analysis by gas chromatography said component was shown to consist of 2 compounds. From mass spectrum analysis said $C_{28}$ component had a molecular weight of 378 ($C_{28}H_{42}$) and nuclear magetic resonance spectrum showed absorption at strength ratio of 1:2 at $4.68\tau$ and $7.98\tau$ and absorption at $5.20\tau$ which was derived from the presence of a vinyl radical. Infrared absorption spectrum showed absorption at 990 cm.$^{-1}$, 965 cm.$^{-1}$ and 910 cm.$^{-1}$. When said $C_{28}$ component was hydrogenated, it absorbed 7 mols of hydrogen to give white crystals.

When recrystallization of said crystals was repeated, a compound having M.P. 47–8° C. was produced which was in accord with the melting point of a known compound, cyclooctacosane (M.P. 48° C.), from which it was known that the main compound of this component was a 28-member ring. From the fact that a mixture of CECP with VCDP and a mixture of VCDP with CTCH exhibited almost the same nuclear magnetic resonance spectrum and infrared absorption spectrum, the separate compounds of this component were 1,5,9,13,17,21,25-cyclooctacosaheptaene (COCH) and 24-vinyl-1,5,9,13.15, 17,21-cyclohexacosahexaene (VCHH), all the double bonds inside the ring thereof were trans:

B.P. 190–5° C./0.02 mm. Hg; $n_D^{20}$=1.5143 (COCH 72%, VCHH 28%).

Confirmation of structures of CDTO and VCTH

A mixture of the $C_{16}$ component through the $C_{36}$ components was distilled, a fraction of B.P. 200–215° C./10$^{-3}$ mm. Hg taken out, and further rectification gave a $C_{32}$ component. From gas chromatography, it was found that said $C_{32}$ component was a mixture of 2 compounds. From mass spectrum analysis, it was known that said $C_{32}$ component had a molecular weight of 432 (corresponding to that of $C_{32}H_{48}$), and in nuclear magnetic resonance spectrum it showed a strong peak at a strength ratio of 1:2 of $4.97\tau$ and $7.94\tau$ and showed slight absorption at $5.15\tau$, derived from the presence of a vinyl radical. In infrared absorption spectrum, it showed absorption at 960 cm.$^{-1}$, 990 cm.$^{-1}$ and 910 cm.$^{-1}$, which was almost same as that of the $C_{28}$ component.

When said $C_{32}$ component was hydrogenated in the presence of a Pd-carbon catalyst, it absorbed 8 mols of hydrogen to give crystals having a molecular weight of 448 (corresponding to that of $C_{32}H_{64}$), and when recryatallization of said crystals was repeated twice, white crystals having a M.P. 55–7° C. were obtained. Said melting point was in accord with the melting point of cyclodotriacontane (58–9° C.). Accordingly, the main compound of the $C_{32}$ component was 32-member ring compound. In view of the foregoing, the two compounds were 1,5,9,13,17,21,25,29 - cyclodotriacontaoctane (CDTO) and 28 - vinyl - 1,5,9,13,17,21,25 - cyclotriacontaheptaene (VCTH), all the double bonds inside the ring thereof being all trans:

B.P. 205–8° C./10$^{-3}$ mm. Hg; $n_D^{20}$=1.5147 (CDTO 71.5%, VCTH 28.5%).

Confirmation of structures of CHTN and VCTO

A mixture of the $C_{16}$ component through the $C_{36}$ components was distilled, a fraction of B.P. 220–240° C./10$^{-3}$ mm. Hg taken, and further rectification gave a $C_{36}$ component. From gas chromatography it was known that said $C_{36}$ component was a mixture of two compounds. From mass spectrum analysis, it was known that said $C_{36}$ component had a molecular weight of 486 (corresponding to that of $C_{36}H_{54}$). In nuclear magnetic resonance spectrum analysis it showed a strong peak at a strength ratio of 1:2 at $4.72\tau$ and $7.96\tau$ and slight absorption at $5.20\tau$, derived from the hydrogen of a vinyl radical. In infrared absorption spectrum it showed absorption at 990 cm.$^{-1}$, 960 cm.$^{-1}$ and 910 cm.$^{-1}$, the absorption being almost same as those of the $C_{28}$ component and $C_{32}$ component. When said $C_{36}$ component was hydrogenated in the presence of a catalyst of Pd-carbon, it absorbed 9 mols of hydrogen to give a compound having a molecular weight of 504 (corresponding to that of $C_{36}H_{72}$). When said compound was recrystallized again, white crystals having a melting point of 67–69° C. were produced, which melting point was in accord with the melting point of a known compound, cyclohexatriacontane (M.P. 70° C.), from which it was known that the main compound of said component was a 36-member ring compound. Therefore, these two compounds were 1,5,9,13,-17,21,25,29,33 - cyclohexatriacontanonaene (CHTN) and 32 - vinyl - 1,5,9,13,17,21,25,29 - cyclotetratriacontaoctaene (VCTO), all the double bonds inside the ring thereof being trans:

B.P. 228–234° C./10$^{-3}$ mm. Hg; $n_D^{20}$=1.5163 (CHTN 73%, VCTO 27%).

Structure of the low molecular weight polymer

When the low molecular weight polymer which was a residual liquid of distillation of up to $C_{36}$ component is analyzed by gel permeation chromatography, decamer, undecamer, and dodecamer of butadiene are detected, their infrared absorption spectra show 990 cm.$^{-1}$, 960 cm.$^{-1}$ and 910 cm.$^{-1}$, almost not different from those of $C_{28}$ component, $C_{32}$ component and $C_{36}$ component, from which it is known that these oligomers of butadiene are, in view of the respective polymerization forms also, large ring polybutadienes. Accordingly, they are large ring poly-trans-1,4-butadiene and large ring monovinyl-trans-1,4-polybutadiene.

Structure of the high molecular weight polymer

In infrared absorption spectrum it has absorption at 990 cm.$^{-1}$, 960 cm.$^{-1}$ and 910 cm.$^{-1}$ and almost same as spectrum of the low molecular weight polymer, from which it is known that the high molecular weight polymer is large ring polybutadiene.

Accordingly, the structure of the high molecular weight polymer is large ring poly-trans-1,4-butadiene and large ring monovinyl-trans-1,4-polybutadiene.

EXAMPLE 2

To 156 g. of butadiene, 5 cc. of an ether solution of 0.71 g. of diallyl nickel and 15 cc. of an ether solution of 0.89 g. of allyl nickel bromide were added, and the mixture was reacted at room temperature for 92 hours. When the reaction liquid was treated according to the same procedure as in Example 1, divided into separate components and analyzed by gas chromatography, the results were as follows.

(Yields)

|  | G. |
|---|---|
| VCH | 0.78 |
| COD | 1.85 |
| CDT | 8.90 |
| CHDT | 4.25 |
| VCTT | 0.90 |
| CECP | 10.10 |
| VCOT | 1.57 |
| CTCH | 9.17 |
| VCDP | 3.01 |
| COCH | 4.43 |
| VCHH | 1.54 |
| CDTO | 2.70 |
| VCTH | 1.14 |
| CHTN | 1.52 |
| VCTO | 0.92 |
| Low molecular weight polymer | 22.5 |
| High molecular weight polymer | 24.9 |
| Recovered butadiene | 51 |

The entire yield of CHDT through VCTO fractions based on the reacted butadiene was 42%.

EXAMPLE 3

To 110 g. of butadiene, 5 cc. of an ether solution of 0.84 g. of dicrotyl nickel and 20 cc. of an ether solution of 1.10 g. of allyl nickel iodide were added and the mixture was reacted at 50° C. for 24 hours. When the reaction liquid was treated according to the same procedure as in Example 1, divided into separate components and analyzed by gas chromatography, the results were as follows:

(Yields)

|  | G. |
|---|---|
| VCH | 0.45 |
| COD | 1.82 |
| CDT | 6.34 |
| CHDT | 2.13 |
| VCTT | 0.51 |
| CECT | 6.45 |
| VCOP | 0.93 |
| CTCH | 6.13 |
| VCDP | 2.00 |
| COCH | 3.14 |
| VCHH | 1.03 |
| CDTO | 1.35 |
| VCTH | 0.62 |
| CHTN | 1.01 |
| VCTO | 0.36 |
| Low molecular weight polymer | 17.9 |
| High molecular weight polymer | 26.1 |
| Recovered butadiene | 29.6 |

The entire yield of CHDT through VCTO fractions based on the reacted butadiene was 34.4%.

EXAMPLE 4

To 125 g. of butadiene, 10 cc. of an ether solution of 1.40 g. of dicyclooctadiene nickel and 0.58 g. of allyl nickel fluoride was added and the mixture was stirred and reacted at 35° C. for 48 hours. When the reaction liquid was treated according to the same procedure as in Example 1, divided into separate components and analyzed by gas chromatography, the results were as follows:

(Yields)

|  | G. |
|---|---|
| VCH | 0.44 |
| COD | 0.92 |
| CDT | 20.6 |
| VCOT | 1.25 |
| CTCH | 8.54 |
| VCDP | 3.16 |
| VCTH | 0.75 |
| CHTN | 1.41 |
| VCTO | 0.52 |
| CHDT | 4.27 |
| VCTT | 0.65 |
| CECP | 9.62 |
| COCH | 4.14 |
| VCHH | 1.78 |
| CDTO | 2.06 |
| Low molecular weight polymer | 7.1 |
| High molecular weight polymer | 5.8 |
| Recovered butadiene | 46.0 |

The entire yield of CHDT through VCTO fractions based on the reacted butadiene was 52.3%.

EXAMPLE 5

To 111 g. of butadiene, 50 cc. of an ether solution of 1.1 g. of cyclododecatriene nickel and 1.7 g. of trityl nickel chloride was added, and the mixture was stirred and reacted at 50° C. for 24 hours. When the reaction liquid was treated according to the same procedure as in Example 1, divided into separate components and analyzed by gas chromatography, the results were as follows:

(Yields)

|  | G. |
|---|---|
| VCH | 0.65 |
| COD | 1.82 |
| CDT | 10.7 |
| CHDT | 3.66 |
| VCTT | 0.53 |
| CECP | 9.27 |
| VCOP | 1.91 |
| CTCH | 6.54 |
| VCDP | 2.25 |
| COCH | 3.22 |
| VCHH | 0.98 |
| CDTO | 2.13 |
| VCTH | 0.56 |
| CHTH | 0.93 |
| VCTO | 0.30 |
| Low molecular weight polymer | 7.6 |
| High molecular weight polymer | 5.3 |
| Recovered butadiene | 48.0 |

The entire yield of CHDT through VCTO components based on the reacted butadiene was 55.3%.

EXAMPLE 6

Following the same procedures as in Examples 1 and 2 the results of carrying out the reactions by changing the relative proportions of diallyl nickel, allyl nickel chloride and allyl nickel bromide were as shown in Table 1 and Table 2.

Reaction conditions: butadiene 130 g.
Reaction temperature: 20–25° C.
Reaction time: 90 hours.

EXAMPLE 7

Following the same procedures as in Examples 1–5, the results of carring out the reactions in the presence of a catalyst system consisting of a combination of a "naked" nickel and a halogenated "naked" nickel were as shown in Table 3.

EXAMPLE 8

To 125 g. of butadiene, an ether solution of 1.43 g. of diallyl nickel was added, and then 0.39 g. of allyl chloride (to be converted to allyl nickel chloride in the reaction system) was added, and this mixture was stirred and reacted at room temperature for 95 hours. After the reaction, when the reaction liquid was treated according to the same procedure as in Example 1, divided into separate components and analyzed by gas chromatography, the results were as follows:

(Yields)

|  | G. |
|---|---|
| $C_8$–$C_{12}$ | 18.43 |
| CHDT | 6.10 |
| VCTT | 0.94 |
| CECP | 10.54 |
| VCOT | 2.03 |
| CTCH | 10.25 |
| VCDP | 3.68 |
| COCH | 4.23 |
| VCHH | 1.35 |
| CDTO | 3.14 |
| VCTH | 1.43 |
| CHTN | 2.10 |
| VCTO | 0.65 |
| Low molecular weight polymer | 11.8 |
| High molecular weight polymer | 9.6 |
| Recovered butadiene | 35.0 |

The entire yield of CHDT through VCTO components based on the reacted butadiene was 54%.

EXAMPLE 9

To 130 g. of butadiene, 10 cc. of an ether solution of 1.43 g. of diallyl nickel and 0.62 g. of allyl bromide (to be converted to allyl nickel bromide in the reaction system) were added, and the mixture was stirred and reacted at 50° C. for 24 hours. When the reaction liquid was treated according to the same procedure as in Example 1, divided into separate fractions and analyzed by gas chromatography, the products obtained as a result were as follows:

(Yields)

|  | G. |
|---|---|
| $C_8$–$C_{12}$ | 8.90 |
| CHDT | 3.95 |
| VCTT | 0.78 |
| CECP | 11.23 |
| VCOT | 1.65 |
| CTCH | 10.14 |
| VCDP | 3.01 |
| COCH | 4.83 |
| VCHH | 1.67 |
| CDTO | 2.72 |
| VCTH | 1.06 |
| CHTN | 1.50 |
| VCTO | 0.69 |
| Low molecular weight polymer | 20.3 |
| High molecular weight polymer | 25.4 |
| Recovered butadiene | 31.0 |

The entire yield of CHDT through VCTO components based on the reacted butadiene was 44%.

TABLE 3

| System | "Naked" nickel, mol | Halogenated "naked" nickel, mol | Butadiene (g.) | Solvent (cc.) | Temp. (°C.) | Time (hr.) | $C_8$–$C_{12}$ (g.) | $C_{16}$ Component (g.) CHDT | $C_{16}$ Component (g.) VCTT |
|---|---|---|---|---|---|---|---|---|---|
| 1 | Diallyl nickel (0.005) | Trityl nickel chloride (0.005). | 117 | | 50 | 24 | 13.2 | 3.66 | 1.23 |
| 2 | Dicyclooctadiene nickel (0.005). | Allyl nickel chloride (0.005). | 54 | Toluene (100) | 25 | 90 | 16.2 | 2.5 | 0.5 |
| 3 | Ditrityl nickel (0.006) | Methallyl nickel chloride (0.004). | 110 | Ether (200) | 40 | 48 | 10.2 | 5.4 | 1.1 |
| 4 | Cyclododecatriene nickel (0.005). | Cyclooctadiene nickel chloride (0.006). | 112 | Benzene (200) | 35 | 63 | 33.0 | 5.8 | 1.2 |
| 5 | Dimethallyl nickel (0.01) | Allyl nickel bromide (0.01). | 270 | | 25 | 110 | 23.6 | 4.1 | 0.8 |
| 6 | Dicyclooctadiene nickel (0.006). | Trityl nickel bromide (0.005). | 110 | Toluene (200) | 40 | 48 | 22.0 | 3.1 | 0.5 |
| 7 | Dicrotyl nickel (0.005) | Allyl nickel bromide (0.005). | 130 | | 50 | 22 | 10.8 | 4.0 | 1.0 |
| 8 | Cyclododecatriene nickel (0.005). | ....do.... | 54 | Hexane (100) | 20 | 96 | 5.1 | 1.6 | 0.4 |
| 9 | Diallyl nickel (0.005) | Trityl nickel iodide (0.005). | 114 | | 35 | 65 | 2.3 | 0.8 | 0.1 |
| 10 | Cyclododecatriene nickel (0.005). | Allyl nickel iodide (0.005) | 125 | | 20 | 94 | 3.6 | 0.7 | 0.1 |
| 11 | Dicyclooctadiene nickel (0.005). | ....do.... | 100 | Benzene (200) | 50 | 27 | 4.2 | 0.6 | 0.1 |
| 12 | Dimethallyl nickel (0.005) | Allyl nickel fluoride (0.005). | 115 | | 40 | 48 | 28.5 | 1.3 | 1.1 |
| 13 | Dicyclooctadiene nickel (0.005). | ....do.... | 124 | Ether (200) | 50 | 24 | 36.6 | 1.7 | 0.9 |
| 14 | Dicyclododecatriene nickel (0.005). | ....do.... | 106 | Benzene (200) | 25 | 90 | 19.2 | 2.0 | 1.1 |

| System | $C_{20}$ component (g) CECP | $C_{20}$ component (g) VCOT | $C_{24}$ component (g) CTCH | $C_{24}$ component (g) VCDP | $C_{28}$ component (g) COCH | $C_{28}$ component (g) VCHH | $C_{32}$ component (g) CDTO | $C_{32}$ component (g) VCTH | $C_{36}$ component (g) CHTN | $C_{36}$ component (g) VCTO | Polymer (g.) Low polymer | Polymer (g.) High polymer | Conversion percent | Yield of $C_{16}$–$C_{32}$ percent |
|---|---|---|---|---|---|---|---|---|---|---|---|---|---|---|
| 1 | 11.27 | 1.98 | 8.53 | 3.12 | 3.22 | 1.18 | 2.23 | 0.56 | 1.01 | 0.32 | 7.6 | 2.9 | 53 | 61.8 |
| 2 | 4.3 | 1.0 | 4.2 | 1.4 | 2.2 | 0.8 | 1.8 | 1.1 | 1.0 | 0.6 | 6.2 | 3.1 | 86.8 | 45.6 |
| 3 | 9.3 | 2.0 | 8.7 | 3.9 | 6.8 | 2.1 | 4.7 | 2.0 | 2.1 | 1.1 | 18.8 | 13.2 | 83.2 | 53.8 |
| 4 | 8.9 | 2.2 | 8.0 | 2.1 | 3.9 | 1.6 | 3.2 | 2.0 | 1.9 | 1.3 | 10.8 | 11.5 | 86.2 | 42.2 |
| 5 | 19.9 | 2.5 | 18.2 | 3.5 | 13.2 | 3.8 | 8.3 | 2.4 | 3.2 | 0.9 | 48.0 | 57.2 | 77.7 | 39.0 |
| 6 | 7.2 | 1.9 | 7.8 | 2.3 | 4.8 | 1.9 | 4.3 | 2.1 | 2.7 | 1.6 | 11.2 | 20.3 | 85.2 | 42.9 |
| 7 | 8.1 | 1.7 | 9.2 | 4.0 | 5.4 | 2.1 | 3.2 | 2.1 | 1.9 | 0.9 | 18.3 | 20.1 | 61.0 | 47.1 |
| 8 | 4.5 | 0.5 | 4.1 | 1.2 | 2.0 | 0.7 | 1.1 | 0.4 | 0.7 | 0.2 | 10.1 | 15.8 | 89.6 | 36.0 |
| 9 | 2.1 | 0.3 | 2.3 | 0.8 | 1.2 | 0.3 | 0.9 | 0.4 | 0.6 | 0.1 | 2.2 | 38.7 | 46.6 | 16.4 |
| 10 | 4.2 | 0.8 | 5.6 | 2.2 | 3.2 | 1.3 | 2.3 | 1.1 | 1.2 | 0.2 | 8.3 | 35.2 | 56.0 | 30.3 |
| 11 | 2.3 | 0.4 | 2.3 | 0.6 | 1.4 | 0.6 | 0.7 | 0.2 | 0.6 | 0.1 | 3.8 | 25.8 | 43.6 | 22.5 |
| 12 | 5.5 | 2.3 | 7.2 | 2.6 | 3.2 | 0.9 | 2.3 | 0.9 | 1.0 | 0.2 | 11.2 | 8.7 | 66.7 | 36.9 |
| 13 | 4.7 | 1.9 | 6.8 | 1.7 | 4.3 | 0.7 | 1.7 | 0.6 | 0.9 | 0.3 | 13.2 | 6.5 | 66.6 | 31.5 |
| 14 | 7.7 | 2.2 | 8.5 | 2.8 | 5.2 | 1.3 | 2.6 | 1.2 | 0.9 | 0.8 | 14.8 | 13.2 | 78.2 | 43.1 |

EXAMPLE 10

2.7 g. of dicyclooctadiene nickel was dissolved in 200 cc. of toluene. 100 g. of butadiene was added to this mixture, and then 0.88 g. of methallyl iodide (to be converted to methallyl nickel iodide in the reaction system) was added thereto, and the final mixture was reacted at 35° C. for 48 hours. After the reaction, the unreacted butadiene was recovered and toluene was distilled off, and thereafter the reaction liquid was treated according to the same procedure as in Example 1.

The results of analyzing each component by gas chromatography were as follows:

(Yields)

| | G. |
|---|---|
| $C_8$–$C_{12}$ | 2.0 |
| CHDT | 0.45 |
| VCTT | 0.06 |
| CECP | 3.56 |
| VCOT | 0.34 |
| CTCH | 4.23 |
| VCDP | 1.15 |
| COCH | 2.03 |
| VCHH | 0.72 |
| CDTO | 1.01 |
| VCTH | 0.22 |
| CHTN | 0.75 |
| VCTO | 0.09 |
| Low molecular weight polymer | 13.1 |
| High molecular weight polymer | 19.2 |
| Recovered butadiene | 45.0 |

The entire yield of CHDT through VCTO components based on the reacted butadiene was 30.0%.

EXAMPLE 11

To 135 g. of butadiene, an ether solution of 1.43 g. of diallyl nickel and 0.3 g. of allyl fluoride (to be converted to allyl nickel fluoride in the reaction system) were added, and the mixture was stirred and reacted at room temperature for about 90 hours. After the reaction, when the reaction liquid was treated according to the same procedure as in Example 1, and analyzed by gas chromatography, the results were as follows:

(Yields)

| | G. |
|---|---|
| $C_8$–$C_{12}$ | 20.8 |
| CHDT | 4.03 |
| VCTT | 0.67 |
| CECP | 10.17 |
| VCOT | 1.26 |
| CTCH | 9.54 |
| VCDP | 2.87 |
| COCH | 4.14 |
| VCHH | 0.99 |
| CDTO | 2.09 |
| VCTH | 0.75 |
| CHTN | 1.49 |
| VCTO | 0.53 |
| Low molecular weight polymer | 7.9 |
| High molecular weight polymer | 6.8 |
| Recovered butadiene | 55.0 |

The entire yield of CHDT through VCTO components based on the reacted butadiene was 52.0%.

EXAMPLE 12

97 g. of butadiene was dissolved in 200 cc. of ether, to which 10 cc. of an ether solution of 2.2 g. of cyclododecatriene nickel, and 1.3 g. of triphenyl methyl chloride (to be converted to triphenyl methyl nickel chloride in the reaction system) were added and the mixture was reacted at room temperature for 115 hours. After the reaction (the unreacted), butadiene was recovered and ether was distilled off. When the reaction product was treated according to the same procedure as in Example 1, and analyzed by gas chromatography, the results were as follows:

(Yields)

|  | G. |
|---|---|
| $C_8$–$C_{12}$ | 12.8 |
| CHDT | 3.29 |
| VCTT | 0.98 |
| CECP | 10.64 |
| VCOT | 1.88 |
| CTCH | 8.56 |
| VCDP | 3.07 |
| COCH | 3.88 |
| VCHH | 1.19 |
| CDTO | 2.01 |
| VCTH | 0.79 |
| CHTN | 1.01 |
| VCTO | 0.33 |
| Low molecular weight polymer | 10.1 |
| High molecular weight polymer | 3.2 |
| Recovered butadiene | 30.0 |

The entire yield of CHDT through VCTO components based on the reacted butadiene was 59%.

EXAMPLE 13

To 130 g. of butadiene, 10 cc. of an ether solution of 1.43 g. of diallyl nickel, and 0.69 g. of ethyl chloroacetate (to be converted to allyl nickel chloride in the reaction system) were added, and the mixture was reacted at 40° C. for 48 hours.

When the reaction liquid was treated as in Example 1, and analyzed by gas chromatography, the results were as follows:

(Yields)

|  | G. |
|---|---|
| $C_8$–$C_{12}$ | 21.7 |
| CHDT | 4.87 |
| VCTT | 0.56 |
| CECP | 9.44 |
| VCOT | 1.21 |
| CTCH | 10.40 |
| VCDP | 2.74 |
| COCH | 3.89 |
| VCHH | 0.94 |
| CDTO | 1.92 |
| VCTH | 0.43 |
| CHTN | 0.84 |
| VCTO | 0.11 |
| Low molecular weight polymer | 12.2 |
| High molecular weight polymer | 12.8 |
| Recovered butadiene | 40.0 |

The entire yield of CHDT through VCTO components based on the reacted butadiene was 44%.

EXAMPLE 14

To 130 g. of butadiene, 10 cc. of an ether solution of 1.43 g. of diallyl nickel, and 0.6 g. of propargyl bromide (to be converted to allyl nickel bromide in the reaction system) were added, and the mixture was reacted at 50° C. for 24 hours. When the reaction liquid was treated as in Example 1, and analyzed by gas chromatography, the results were as follows:

(Yields)

|  | G. |
|---|---|
| $C_8$–$C_{12}$ | 8.70 |
| CHDT | 3.55 |
| VCTT | 0.70 |
| CECP | 10.03 |
| VCOT | 1.66 |
| CTCH | 10.04 |
| VCDP | 3.00 |
| COCH | 3.86 |
| VCHH | 0.99 |
| CDTO | 2.77 |
| VCTH | 1.10 |
| CHTN | 1.50 |
| VCTO | 0.53 |
| Low molecular weight polymer | 20.6 |
| High molecular weight polymer | 28.4 |
| Recovered butadiene | 27.0 |

The entire yield of CHDT through VCTO components based on the reacted butadiene was 40.0%.

EXAMPLE 15

107 g. of butadiene was dissolved in 250 cc. of hexane, to which 2.7 g. of dicyclooctadiene nickel and 10 cc. of an ether solution of 0.19 g. of hydrogen chloride (to be converted to butenyl nickel chloride in the reaction system) were added, and the mixture was reacted at 50° C. for 24 hours. The unreacted butadiene was recovered and hexane was distilled off. Thereafter when the reaction product was treated as in Example 1, and analyzed by gas chromatography, the results were as follows:

(Yields)

|  | G. |
|---|---|
| $C_8$–$C_{12}$ | 17.21 |
| CHDT | 5.62 |
| VCTT | 0.81 |
| CECP | 9.88 |
| VCOT | 2.01 |
| CTCH | 8.99 |
| VCDP | 3.17 |
| COCH | 4.24 |
| VCHH | 1.19 |
| CDTO | 2.79 |
| VCTH | 0.87 |
| CHTN | 1.35 |
| VCTO | 0.63 |
| Low molecular weight polymer | 8.5 |
| High molecular weight polymer | 7.4 |
| Recovered butadiene | 30.0 |

The entire yield of CHDT through VCTO components based on the reacted butadiene was 55.3%.

EXAMPLE 16

To 127 g. of butadiene, 10 cc. of an ether solution of 1.43 g. of diallyl nickel, and 0.5 g. of propionyl fluoride (to be converted to allyl nickel fluoride in the reaction system) were added, and the mixture was stirred and reacted at 35° C. for 48 hours. When the reaction liquid was treated as in Example 1, and analyzed by gas chromatography, the results were as follows:

(Yields)

|  | G. |
|---|---|
| $C_8$–$C_{12}$ | 32.1 |
| CHDT | 4.78 |
| VCTT | 0.77 |
| CECP | 8.40 |
| VCOT | 1.38 |
| CTCH | 7.97 |
| VCDP | 2.38 |
| COCH | 3.94 |
| VCHH | 1.01 |
| CDTO | 2.39 |
| VCTH | 0.78 |
| CHTN | 1.13 |
| VCTO | 0.25 |
| Low molecular weight polymer | 6.3 |
| High molecular weight polymer | 4.5 |
| Recovered butadiene | 45.0 |

The entire yield of CHDT through VCTO components based on the reacted butadiene was 45.0%.

TABLE 4

| System | Diallyl nickel (mol) | Allyl chloride (mol) | $C_8$-$C_{12}$ (g.) | $C_{16}$ component (g.) | | $C_{20}$ component (g.) | | $C_{24}$ component (g.) | | $C_{28}$ component (g.) | | $C_{32}$ component (g.) | | $C_{36}$ component (g.) | | Polymer (g.) | | Conversion (percent) | Yield of $C_{16}$-$C_{36}$ (percent) |
|---|---|---|---|---|---|---|---|---|---|---|---|---|---|---|---|---|---|---|---|
| | | | | CHDT | VCTT | CECP | VCOT | CTCH | VCDP | COCH | VCHH | CDTO | VCTH | CHTN | VCTO | Low | High | | |
| 1 | 0.01 | 0.002 | 32.1 | 3.34 | 0.72 | 9.92 | 1.35 | 8.13 | 2.34 | 4.17 | 1.35 | 2.68 | 1.01 | 1.32 | 0.62 | 9.6 | 6.4 | 65.6 | 43.4 |
| 2 | 0.01 | 0.003 | 13.6 | 5.49 | 1.02 | 10.51 | 1.68 | 10.23 | 3.25 | 5.08 | 1.32 | 3.00 | 1.04 | 1.52 | 0.73 | 12.3 | 22.9 | 72.4 | 48.2 |
| 3 | 0.01 | 0.004 | 10.3 | 3.25 | 0.79 | 10.15 | 1.57 | 9.41 | 3.05 | 4.39 | 1.67 | 3.59 | 1.12 | 1.77 | 0.42 | 12.1 | 13.8 | 59.5 | 53.6 |
| 4 | 0.01 | 0.005 | 16.5 | 5.61 | 1.01 | 12.54 | 2.19 | 10.38 | 3.33 | 4.76 | 1.50 | 3.13 | 1.31 | 1.39 | 0.37 | 10.1 | 10.4 | 64.8 | 55.6 |
| 5 | 0.01 | 0.006 | 16.6 | 6.25 | 1.64 | 12.84 | 1.62 | 10.00 | 3.42 | 6.17 | 1.47 | 3.32 | 1.40 | 1.52 | 0.38 | 11.2 | 6.4 | 58.5 | 56.6 |
| 6 | 0.01 | 0.008 | 9.4 | 1.96 | 0.32 | 5.77 | 0.38 | 4.85 | 1.58 | 1.89 | 0.82 | 1.32 | 0.53 | 0.79 | 0.21 | 1.1 | 2.1 | 26.2 | 61.8 |

Note.—Reaction condition: butadiene, 130 g.; temperature, 20–25° C.; time, 91 hrs.

EXAMPLE 17

Operating in accordance with the procedure of Example 8, except for changed proportions of diallyl nickel and allyl chloride, the results shown in Table 4 were obtained.

EXAMPLE 18

As in Examples 9–16, butadiene was reacted in the presence of a catalyst system consisting of a "naked" nickel and various organic halides, the results being shown in Table 5, wherein the halogenated "naked" nickels to be produced in the reaction system were as follows:

System (1–2) allyl nickel chloride
(3) benzyl nickel chloride+allyl nickel chloride
(4) allyl nickel chloride+methoxymethylene nickel chloride
(5) allyl nickel chloride+acetylmethylene nickel chloride
(6) allyl nickel chloride+methallyl nickel chloride
(7) allyl nickel chloride+crotyl nickel chloride
(8) allyl nickel chloride+crotyl nickel chloride
(9) methallyl nickel chloride
(10–11) allyl nickel chloride
(12) triphenyl methyl nickel chloride+crotyl nickel chloride
(13) crotyl nickel chloride+allyl nickel chloride
(14) trityl nickel chloride+allyl nickel chloride
(15–16) allyl nickel chloride
(17) allyl nickel bromide+butenyl nickel bromide
(18) allyl nickel bromide+trityl nickel bromide
(19) allyl nickel bromide
(20) allyl nickel bromide+methallyl nickel bromide
(21–24) allyl nickel bromide
(25) butenyl nickel bromide
(26) propargyl nickel bromide
(27) allyl nickel iodide+triphenyl methyl nickel iodide
(28–32) allyl nickel iodide
(33–34) allyl nickel fluoride
(35) allyl nickel fluoride+trityl nickel fluoride
(36) allyl nickel fluoride

EXAMPLE 19

2.55 g. of nickel acetylacetonate (to be converted to 1,1'-(3-hexenylene)diallyl nickel) was dissolved in 50 cc. of toluene and 10 cc. of butadiene was added thereto. Thereafter the resulting mixture was cooled to 0° C., to which 20 cc. of a toluene solution of 3.2 cc. of ethoxydiethyl aluminium was added dropwise. The solution changed from green to red, and 236 g. of butadiene was added. Thereafter 30 cc. of an ether solution of 1.34 g. of allyl nickel chloride was added thereto, and the mixture was stirred and reacted at 40° C. for 45 hours. After the reaction, the unreacted butadiene was recovered and when the reaction liquid was treated as in Example 1, and analyzed by gas chromatography, the results were as follows:

(Yields)

| | G. |
|---|---|
| $C_8$–$C_{12}$ | 52.6 |
| CHDT | 7.03 |
| VCTT | 1.07 |
| CECP | 15.42 |
| VCOT | 2.77 |
| CTCH | 14.82 |
| VCDP | 4.23 |
| COCH | 8.41 |
| VCHH | 2.66 |
| CDTO | 4.00 |
| VCTH | 1.08 |
| CHTN | 2.70 |
| VCTO | 0.93 |
| Low molecular weight polymer | 24.8 |
| High molecular weight polymer | 18.5 |
| Recovered butadiene | 63.0 |

The entire yield of CHDT through VCTO components based on the reacted butadiene was 41%.

EXAMPLE 20

2.55 g. of nickel acetylacetonate (to be converted to 1,1'-(3-hexenylene)diallyl nickel) was dissolved in 50 cc. of toluene and 20 cc. of butadiene was added thereto. Thereafter the resulting solution was cooled to 0° C., to which 20 cc. of a toluene solution of 3.2 cc. of ethoxydiethyl aluminium was added dropwise. To this solution, which changed color from green to red, 114 g. of butadiene was added. Thereafter, 0.40 g. of allyl chloride (to be converted to allyl nickel chloride) was added, and the mixture was stirred and reacted at room temperature for 90 hours. The product was treated according to the same procedure as in Example 19, and was analyzed by gas chromatography, the results being as follows:

|  | G. |
|---|---|
| $C_8$–$C_{12}$ | 27.3 |
| CHDT | 3.52 |
| VCTT | 0.94 |
| CECP | 7.04 |
| VCOT | 1.35 |
| CTCH | 8.06 |
| VCDP | 2.93 |
| COCH | 4.04 |
| VCHH | 1.37 |
| CDTO | 2.19 |
| VCTH | 0.78 |
| CHTN | 1.34 |
| VCTO | 0.67 |
| Low molecular weight polymer | 12.4 |
| High molecular weight polymer | 9.7 |
| Recovered butadiene | 33.0 |

The entire yield of CHDT through VCTO components based on the reacted butadiene was 41%.

EXAMPLE 21

As in Example 19, butadiene was reacted in the presence of a catalyst consisting of a "naked" nickel compound and a halogenated "naked" nickel compound prepared from a combination of a nickel compound and an organoaluminium compound or other reducing agent, and the results were as shown in Table 6. In this case, 1,1'-(3-hexenylene)diallyl nickel was produced as "naked" nickel in the reaction system.

EXAMPLE 22

Butadiene was reacted in the presence of a catalyst system consisting of a "naked" nickel compound prepared as in Example 20 and an organic halogen compound, and the results were as shown in Table 7.

| System | "Naked" nickel | Halogenated "naked" nickel |
|---|---|---|
| 1–3 | 1,1'-(3-hexenylene)diallyl nickel | Allyl nickel chloride. |
| 4 | do | Triphenyl methyl nickel chloride. |
| 5 | do | Propargyl nickel chloride. |
| 6 | do | Methallyl nickel chloride. |
| 7–10 | do | Allyl nickel chloride. |
| 11–12 | do | Allyl nickel bromide. |
| 13 | do | Allyl nickel iodide. |
| 14 | do | Allyl nickel fluoride. |

EXAMPLE 23

2.02 g. of allkyl nickel chloride was dissolved in 50 cc. of ether, to which 10 cc. of ether solution containing 0.03 mol of ammonia was added, and the mixture was stirred at −10° C. (to produce diallyl nickel). After 2 hours, 110 g. of butadiene was added to the mixture, and the resulting mixture was reacted with stirring at room temperature for 95 hours. After the reaction, the reaction liquid was treated according to the same procedure as in Example 1, and each component was analyzed by gas chromatography, and the results were as follows:

(Yields)

|  | G. |
|---|---|
| $C_8$–$C_{12}$ | 8.7 |
| CHDT | 2.14 |
| VCTT | 0.43 |
| CECP | 4.25 |
| VCOT | 1.00 |
| CTCH | 3.84 |
| VCDP | 1.33 |
| COCH | 1.42 |
| VCHH | 0.38 |
| CDTO | 0.92 |
| VCTH | 0.28 |
| CHTN | 0.53 |
| VCTO | 0.18 |
| Low molecular weight polymer | 3.5 |
| High molecular weight polymer | 4.1 |
| Recovered butadiene | 70.0 |

The entire yield of CHDT through VCTO components based on the reacted butadiene was 50%.

EXAMPLE 24

10 cc. of an ether solution of 1.43 g. of diallyl nickel, and 0.43 g. of anhydrous nickel chloride (to be converted to allyl nickel chloride) were added to 128 g. of butadiene, and the mixture was reacted with vigorous stirring at 50° C. for 25 hours. After the reaction, when the reaction liquid was treated as in Example 1, and analyzed by gas chromatography, the results were as follows:

(Yields)

|  | G. |
|---|---|
| $C_8$–$C_{12}$ | 48.9 |
| CHDT | 0.81 |
| VCTT | 0.07 |
| CECP | 1.56 |
| VCOT | 0.23 |
| CTCH | 1.31 |
| VCDP | 0.52 |
| COCH | 0.57 |
| VCHH | 0.13 |
| CDTO | 0.23 |
| VCTH | 0.07 |
| CHTN | 0.04 |
| VCTO | 0.00 |
| Low molecular weight polymer | 1.9 |
| High molecular weight polymer | 5.3 |
| Recovered butadiene | 60.0 |

The entire yield of CHDT through VCTO components based on the reacted butadiene was 9.8%.

EXAMPLE 25

To 120 g. of butadiene, 10 cc. of an ether solution of 1.43 g. of diallyl nickel and a red solution obtained by reacting 1.7 g. of nickel carbonyl with 0.76 g. of allyl chloride (to be converted to allyl nickel chloride) in 50 cc. of ether were added, and the mixture was reacted at 40° C. for 48 hours. The reaction liquid was treated as in Example 1, and analyzed by gas chromatography. The results were as follows:

(Yields)

|  | G. |
|---|---|
| $C_8$–$C_{12}$ | 17.50 |
| CHDT | 6.23 |
| VCTT | 0.84 |
| CECP | 9.24 |

|          | G.   |
|----------|------|
| VCOT     | 1.81 |
| CTCH     | 8.43 |
| VCDP     | 2.99 |
| COCH     | 3.88 |
| VCHH     | 1.28 |
| CDTO     | 2.69 |
| VCTH     | 0.97 |
| CHTN     | 1.59 |
| VCTO     | 0.38 |
| Low molecular weight polymer | 8.9 |
| High molecular weight polymer | 12.1 |
| Recovered butadiene | 40.0 |

The entire yield of CHDT through VCTO components based on the reacted butadiene was 51%.

EXAMPLE 26

1.27 g. of anhydrous nickel chloride was suspended in 50 cc. of ether, to which 10 cc. of butadiene was added. When 30 cc. of ether containing 0.015 mol of n-butyl lithium was slowly added to the mixture at 0° C., a red solution (indicating 1,1'-(3-hexenyl)diallyl nickel and octenyl nickel chloride) was obtained. To said solution, 127 g. of butadiene was added and the resulting mixture was stirred and reacted at 50° C. for 20 hours. The reaction liquid was treated as in Example 1, and each component was analyzed by gas chromatography, and the results were as follows:

(Yields)

|          | G.   |
|----------|------|
| $C_8$–$C_{12}$ | 16.2 |
| CHDT     | 1.23 |
| VCTT     | 0.24 |
| CECP     | 2.68 |
| VCOT     | 0.61 |
| CTCH     | 2.47 |
| VCDP     | 0.69 |
| COCH     | 1.03 |
| VCHH     | 0.37 |
| CDTO     | 0.64 |
| VCTH     | 0.29 |
| CHTN     | 0.28 |
| VCTO     | 0.10 |
| Low molecular weight polymer | 2.4 |
| High molecular weight polymer | 6.9 |
| Recovered butadiene | 82.0 |

The entire yield of CHDT through VCTO components based on the reacted butadiene was 29.5%.

EXAMPLE 27

1.41 g. of allyl nickel bromide was dissolved in 50 cc. of ether, to which 35 cc. of an ether solution containing 0.005 mol of allyl magnesium bromide was slowly added dropwise at −10° to −20° C. To this mixture (containing 0.005 mol of diallyl nickel and 0.005 mol of allyl nickel bromide) was added to 134 g. of butadiene, and this mixture was reacted at 35° C. for 52 hours. The reaction liquid was treated as in Example 1, and each component was analyzed by gas chromatography. The results were as follows:

(Yields)

|          | G.   |
|----------|------|
| $C_8$–$C_{12}$ | 32.8 |
| CHDT     | 4.13 |
| VCTT     | 0.78 |
| CECP     | 4.95 |
| VCOT     | 1.03 |
| CTCH     | 3.88 |
| VCDP     | 1.70 |
| COCH     | 2.44 |
| VCHH     | 1.00 |
| CDTO     | 1.38 |
| VCTH     | 0.57 |
| CHTN     | 0.43 |
| VCTO     | 0.12 |
| Low molecular weight polymer | 4.7 |
| High molecular weight polymer | 8.1 |
| Recovered butadiene | 60.0 |

The entire yield of CHDT through VCTO components based on the reacted butadiene was 33%.

EXAMPLE 28

2.2 g. of anhydrous nickel bromide was suspended in 50 cc. of toluene, to which suspension 10 cc. of butadiene was added and the mixture was cooled to 0° C., to which a toluene solution containing 2.3 cc. of diethyl aluminium ethoxide was slowly added with vigorous stirring producing a red solution (containing 1,1'-(3-hexenyl)diallyl nickel and hexenyl nickel bromide) to which 117 g. of butadiene was added and the mixture reacted at 35° C. for 49 hours. When the reaction liquid was treated as in Example 1, each component was analyzed by gas chromatography. The results were as follows:

(Yields)

|          | G.   |
|----------|------|
| $C_8$–$C_{12}$ | 8.40 |
| CHDT     | 1.93 |
| VCTT     | 0.42 |
| CECP     | 3.81 |
| VCOT     | 0.72 |
| CTCH     | 3.33 |
| VCDP     | 1.13 |
| COCH     | 1.78 |
| VCHH     | 0.79 |
| CDTO     | 0.81 |
| VCTH     | 0.23 |
| CHTN     | 0.35 |
| VCTO     | 0.14 |
| Low molecular weight polymer | 8.95 |
| High molecular weight polymer | 14.3 |
| Recovered butadiene | 66.0 |

The entire yield of CHDT through VCTO components based on the reacted butadiene was 32%.

EXAMPLE 29

Following the same procedure as in Example 23, butadiene was reacted in the presence of a catalyst system consisting of allyl nickel halogenide and amines. The results were as shown in Table 8.

In these cases, diallyl (or dimethallyl) nickel and allyl (or dimethallyl) nickel halide were co-existing in reaction systems.

EXAMPLE 30

Following the same procedure as in Example 24, butadiene was reacted in the presence of a catalyst system consisting of combination of a "naked" nickel and an anhydrous nickel halide. The results were as shown in Table 9.

In these cases, allyl (or trityl) nickel halide was existing as halogenated "naked" nickel in the reaction system.

EXAMPLE 31

Following the same procedures as in Examples 26, 27 and 28, butadiene was reacted in the presence of a catalyst system consisting of a combination of a nickel halide with organic lithium or other reducing agent. The results were as shown in Table 10.

TABLE 5

| System | "Naked" nickel, mol | Organo halide | Solvent (cc.) | Butadiene (g.) | Temp. (°C.) | Time (hr.) | $C_8$–$C_{12}$ (g.) | $C_{16}$ component (g.) CHDT | $C_{16}$ component (g.) VCTT |
|---|---|---|---|---|---|---|---|---|---|
| 1 | Diallyl nickel (0.01) | n-BuCl (0.005) | | 132 | 25 | 94 | 52.3 | 0.3 | 0.0 |
| 2 | do | ⬡—Cl (0.005) | | 127 | 25 | 94 | 51.7 | 0.5 | 0.1 |
| 3 | do | ⬡—CH₂Cl (0.005) | | 132 | 25 | 94 | 43.5 | 0.4 | 0.2 |
| 4 | do | ClCH₂—OCH₃ (0.005) | | 111 | 25 | 105 | 50.5 | 0.9 | 0.3 |
| 5 | do | ClCH₂COCH₃ (0.005) | | 117 | 25 | 105 | 22.3 | 4.2 | 0.7 |
| 6 | do | CH₃CH=CHCH₂Cl (0.005) | | 130 | 25 | 114 | 15.2 | 5.4 | 1.2 |
| 7 | do | CH₂=C(CH₃)CH₂Cl (0.005) | | 130 | 25 | 114 | 15.7 | 6.0 | 1.3 |
| 8 | do | ClCH₂CH=CHCH₂Cl (0.003) | | 130 | 25 | 114 | 18.4 | 4.5 | 1.2 |
| 9 | Dimethallyl nickel (0.01) | CF₃CF₂—Cl (0.005) | | 130 | 40 | 48 | 17.4 | 6.1 | 1.1 |
| 10 | Diallyl nickel (0.01) | CH₃COCl (0.005) | Ether (150) | 130 | 25 | 145 | 31.5 | 3.2 | 0.8 |
| 11 | do | Cl₂ (0.003) | Ether (50) | 127 | 35 | 65 | 12.3 | 1.8 | 0.3 |
| 12 | Dicrotyl nickel (0.01) | Ph₃CCl (0.005) | | 115 | 25 | 96 | 11.5 | 5.2 | 0.8 |

| System | $C_{20}$ component (g.) CECP | $C_{20}$ component (g.) VCOT | $C_{24}$ component (g.) CTCH | $C_{24}$ component (g.) VCDP | $C_{28}$ component (g.) COCH | $C_{28}$ component (g.) VCHH | $C_{32}$ component (g.) CDTO | $C_{32}$ component (g.) VCTH | $C_{36}$ component (g.) CHTN | $C_{36}$ component (g.) VCTO | Polymer (g.) Low | Polymer (g.) High | Conversion, percent | Yield of $C_{16}$–$C_{32}$, percent |
|---|---|---|---|---|---|---|---|---|---|---|---|---|---|---|
| 1 | 0.1 | 0.0 | 0.3 | 0.1 | 0.1 | 0.0 | 0.0 | 0.0 | 0.0 | 0.0 | 0.3 | 0.4 | 40.8 | 1.5 |
| 2 | 0.1 | 0.0 | 0.2 | 0.0 | 0.1 | 0.0 | 0.0 | 0.0 | 0.0 | 0.0 | 0.4 | 0.4 | 42.1 | 1.9 |
| 3 | 0.6 | 0.1 | 1.9 | 0.7 | 0.3 | 0.0 | 0.1 | 0.0 | 0.0 | 0.0 | 0.2 | 2.1 | 38.0 | 8.8 |
| 4 | 4.6 | 0.7 | 6.1 | 2.1 | 1.9 | 0.4 | 1.2 | 0.2 | 0.6 | 0.2 | 13.5 | 7.1 | 81.5 | 21.3 |
| 5 | 7.7 | 1.4 | 6.5 | 2.0 | 2.2 | 0.6 | 1.8 | 0.3 | 1.0 | 0.4 | 23.3 | 10.5 | 72.5 | 34.0 |
| 6 | 11.2 | 1.8 | 8.6 | 2.3 | 4.2 | 1.6 | 3.2 | 1.0 | 1.7 | 0.6 | 30.5 | 8.3 | 74.6 | 44.3 |
| 7 | 10.0 | 1.6 | 9.4 | 2.1 | 4.4 | 1.0 | 2.5 | 0.6 | 1.7 | 0.5 | 29.5 | 18.5 | 79.2 | 40.2 |
| 8 | 11.6 | 1.9 | 7.3 | 1.9 | 4.6 | 1.8 | 3.3 | 1.1 | 1.8 | 0.4 | 10.0 | 15.4 | 65.4 | 48.8 |
| 9 | 11.3 | 2.1 | 10.5 | 3.2 | 4.5 | 1.7 | 3.0 | 1.2 | 1.5 | 0.7 | 13.5 | 21.4 | 76.0 | 46.9 |
| 10 | 9.3 | 1.6 | 7.9 | 2.4 | 3.2 | 1.2 | 1.8 | 0.8 | 0.7 | 0.1 | 12.1 | 15.3 | 69.2 | 34.4 |
| 11 | 4.5 | 1.1 | 6.2 | 2.1 | 3.1 | 0.7 | 1.4 | 0.4 | 0.5 | 0.1 | 16.1 | 13.8 | 50.7 | 34.5 |
| 12 | 10.4 | 1.9 | 8.9 | 3.2 | 4.1 | 1.7 | 2.1 | 0.7 | 0.8 | 0.2 | 10.0 | 7.4 | 60.0 | 58.0 |

| System | "Naked" nickel, mol | Organo halide | Solvent (cc.) | Butadiene (g.) | Temp. (°C.) | Time (hr.) | $C_8$–$C_{12}$ (g.) | $C_{16}$ component (g.) CHDT | $C_{16}$ component (g.) VCTT |
|---|---|---|---|---|---|---|---|---|---|
| 13 | Dicrotyl nickel (0.01) | CH₂=CH—CH₂Cl (0.005) | | 123 | 50 | 24 | 16.4 | 6.0 | 1.0 |
| 14 | Ditrityl nickel (0.01) | Same as above | Benzene (300) | 145 | 50 | 24 | 17.3 | 7.3 | 1.1 |
| 15 | Cyclododecatriene nickel (0.01) | do | Benzene (100) | 117 | 25 | 110 | 15.5 | 4.9 | 0.8 |
| 16 | Diallyl nickel (0.01) | CH₃—⬡—SO₃Cl (0.005) | | 123 | 25 | 100 | 28.9 | 3.1 | 0.6 |
| 17 | do | CH₃CH=CHCH₂Br (0.005) | Ether (200) | 100 | 40 | 50 | 16.8 | 2.0 | 0.2 |
| 18 | do | Ph₃CBr (0.005) | | 113 | 25 | 90 | 14.3 | 3.1 | 0.5 |
| 19 | do | CH₃COBr (0.005) | Benzene (200) | 93 | 25 | 110 | 8.2 | 2.2 | 0.3 |
| 20 | do | CH₂=C(CH₃)—CH₂Br (0.005) | | 129 | 30 | 110 | 13.2 | 3.4 | 0.5 |
| 21 | do | HBr (0.005) | | 133 | 25 | 90 | 13.2 | 4.7 | 1.1 |
| 22 | do | Br₂ (0.003) | | 123 | 25 | 90 | 10.7 | 2.5 | 0.3 |
| 23 | do | CF₃CF₂—Br (0.005) | | 126 | 25 | 93 | 9.1 | 1.7 | 0.2 |
| 24 | Dicyclooctadiene nickel (0.01) | CH₂=CHCH₂Br (0.005) | | 139 | 35 | 90 | 32.9 | 2.8 | 0.4 |

| System | $C_{20}$ component (g.) CECP | $C_{20}$ component (g.) VCOT | $C_{24}$ component (g.) CTCH | $C_{24}$ component (g.) VCDP | $C_{28}$ component (g.) COCH | $C_{28}$ component (g.) VCHH | $C_{32}$ component (g.) CDTO | $C_{32}$ component (g.) VCTH | $C_{36}$ component (g.) CHTN | $C_{36}$ component (g.) VCTO | Polymer (g.) Low | Polymer (g.) High | Conversion, percent | Yield of $C_{16}$–$C_{32}$, percent |
|---|---|---|---|---|---|---|---|---|---|---|---|---|---|---|
| 13 | 11.3 | 1.5 | 10.6 | 3.2 | 4.9 | 2.0 | 3.2 | 1.3 | 1.7 | 0.5 | 13.2 | 14.5 | 74.8 | 52.2 |
| 14 | 12.4 | 2.1 | 12.3 | 4.1 | 6.2 | 1.9 | 3.7 | 1.2 | 1.9 | 0.7 | 12.3 | 13.8 | 67.0 | 53.4 |
| 15 | 10.6 | 1.6 | 9.6 | 3.3 | 4.8 | 1.3 | 2.4 | 0.8 | 1.0 | 0.4 | 10.6 | 8.9 | 65.3 | 54.6 |
| 16 | 6.2 | 1.1 | 5.3 | 2.0 | 3.0 | 1.2 | 1.8 | 0.7 | 0.7 | 0.2 | 4.5 | 3.2 | 60.0 | 42.2 |
| 17 | 7.9 | 1.2 | 7.1 | 1.8 | 4.6 | 1.4 | 2.7 | 1.5 | 1.9 | 0.6 | 15.0 | 9.0 | 73.7 | 44.5 |
| 18 | 7.0 | 1.8 | 7.9 | 2.4 | 5.2 | 1.6 | 4.8 | 2.1 | 2.6 | 1.5 | 13.8 | 19.2 | 77.7 | 46.1 |
| 19 | 5.4 | 0.8 | 5.3 | 2.1 | 3.2 | 1.0 | 2.1 | 0.8 | 0.9 | 0.2 | 9.7 | 21.2 | 68.2 | 39.9 |
| 20 | 7.7 | 0.9 | 9.3 | 2.2 | 8.7 | 3.0 | 4.0 | 1.3 | 2.0 | 0.7 | 28.2 | 30.1 | 89.3 | 37.9 |
| 21 | 11.1 | 1.7 | 10.9 | 4.1 | 5.7 | 1.9 | 3.0 | 1.4 | 1.9 | 1.2 | 23.8 | 27.8 | 83.8 | 42.0 |
| 22 | 7.6 | 1.3 | 7.0 | 2.8 | 4.5 | 1.6 | 2.7 | 1.1 | 1.2 | 0.5 | 19.2 | 29.2 | 69.8 | 41.7 |
| 23 | 5.7 | 1.0 | 6.2 | 3.1 | 4.1 | 1.3 | 2.4 | 0.8 | 1.5 | 0.6 | 13.6 | 31.2 | 65.3 | 34.5 |
| 24 | 6.2 | 2.1 | 9.7 | 3.1 | 8.5 | 2.7 | 4.7 | 1.8 | 2.9 | 0.9 | 15.2 | 13.8 | 77.4 | 42.6 |

TABLE 5.—Continued

| System | "Naked" nickel, mol | Organo halide | Solvent (cc.) | Butadiene (g.) | Temp. (°C.) | Time (hr.) | $C_8$-$C_{12}$ (g.) | $C_{16}$ component (g.) CHDT | $C_{16}$ component (g.) VCTT |
|---|---|---|---|---|---|---|---|---|---|
| 25 | Dicyclooctadiene nickel (0.01) | $CH_3CH=CHCH_2Br$ (0.005) | --- | 114 | 35 | 90 | 23.2 | 1.4 | 0.3 |
| 26 | do | $HC\equiv CCH_2Br$ (0.005) | --- | 125 | 35 | 90 | 11.2 | 1.9 | 0.4 |
| 27 | Diallyl nickel (0.01) | $Ph_3Cl$ (0.005) | Ether (200) | 101 | 25 | 110 | 1.9 | 0.7 | 0.1 |
| 28 | do | $CH_3I$ (0.005) | do | 93 | 25 | 110 | 4.2 | 0.6 | 0.1 |
| 29 | do | $CF_3I$ (0.005) | do | 76 | 25 | 140 | 7.2 | 0.5 | 0.1 |
| 30 | do | $CH_3COI$ (0.005) | do | 108 | 25 | 110 | 3.6 | 1.7 | 0.3 |
| 31 | do | $I_2$ (0.003) | --- | 118 | 25 | 90 | 3.1 | 0.9 | 0.2 |
| 32 | do | HI (0.005) | --- | 126 | 25 | 90 | 2.3 | 1.2 | 0.3 |
| 33 | do | HF (0.005) | --- | 108 | 25 | 90 | 20.2 | 1.8 | 1.3 |
| 34 | do | $F_2$ (0.003) | --- | 119 | 25 | 90 | 25.2 | 1.5 | 1.1 |
| 35 | do | $Ph_3CF$ (0.005) | --- | 112 | 25 | 90 | 21.3 | 2.3 | 1.9 |
| 36 | do | $CF_3COF$ (0.005) | --- | 116 | 25 | 90 | 17.6 | 1.4 | 1.0 |

| System | $C_{20}$ component (g.) CECP | $C_{20}$ component (g.) VCOT | $C_{24}$ component (g.) CTCH | $C_{24}$ component (g.) VCDP | $C_{28}$ component (g.) COCH | $C_{28}$ component (g.) VCHH | $C_{32}$ component (g.) CDTO | $C_{32}$ component (g.) VCTH | $C_{3-}$ component (g.) CHTN | $C_{3-}$ component (g.) VCTO | Polymer (g.) Low | Polymer (g.) High | Conversion, percent | Yield of $C_1$.-$C_{32}$, percent |
|---|---|---|---|---|---|---|---|---|---|---|---|---|---|---|
| 25 | 5.1 | 1.6 | 7.2 | 1.9 | 8.1 | 2.6 | 3.2 | 1.1 | 1.2 | 0.5 | 15.1 | 12.6 | 74.7 | 40.1 |
| 26 | 4.2 | 1.2 | 7.3 | 1.8 | 7.1 | 2.3 | 3.4 | 1.1 | 1.5 | 0.5 | 16.9 | 21.6 | 65.9 | 39.7 |
| 27 | 2.2 | 0.4 | 2.6 | 1.2 | 1.6 | 0.4 | 0.9 | 0.4 | 0.3 | 0.1 | 3.6 | 42.6 | 59.0 | 18.5 |
| 28 | 1.8 | 0.3 | 2.2 | 0.7 | 1.6 | 0.6 | 0.8 | 0.3 | 0.5 | 0.1 | 2.6 | 30.5 | 49.4 | 25.1 |
| 29 | 1.4 | 0.3 | 1.9 | 0.6 | 2.0 | 0.6 | 0.9 | 0.3 | 0.4 | 0.1 | 1.5 | 19.6 | 49.2 | 28.5 |
| 30 | 2.4 | 0.6 | 3.1 | 1.1 | 2.6 | 1.2 | 1.1 | 0.3 | 0.9 | 0.2 | 13.2 | 25.8 | 54.7 | 26.7 |
| 31 | 1.4 | 0.3 | 1.7 | 0.5 | 1.7 | 0.6 | 0.8 | 0.2 | 0.4 | 0.1 | 1.2 | 40.6 | 45.5 | 18.6 |
| 32 | 2.3 | 0.7 | 2.6 | 0.9 | 2.3 | 1.2 | 0.9 | 0.3 | 0.6 | 0.1 | 3.6 | 49.1 | 54.3 | 19.6 |
| 33 | 6.5 | 2.4 | 7.6 | 2.6 | 6.1 | 2.0 | 1.9 | 1.0 | 0.9 | 0.2 | 11.6 | 9.2 | 69.8 | 45.6 |
| 34 | 4.8 | 1.6 | 5.1 | 2.1 | 3.8 | 1.1 | 1.6 | 0.8 | 0.6 | 0.1 | 8.6 | 8.6 | 56.0 | 36.3 |
| 35 | 5.2 | 2.1 | 5.6 | 2.2 | 3.1 | 0.8 | 1.7 | 0.6 | 0.5 | 0.1 | 7.9 | 6.5 | 55.3 | 41.2 |
| 36 | 4.6 | 1.3 | 5.2 | 1.9 | 2.8 | 0.9 | 1.1 | 0.5 | 0.5 | 0.1 | 6.7 | 9.6 | 47.6 | 38.6 |

TABLE 6

| System | Nickel compound, mol | Organo aluminum compound or other reducing agent, mol | Halogenated "naked" nickel, mol | Butadiene (g.) | Solvent (cc.) | Temp. (°C.) | Time (hr.) | $C_6$-$C_{12}$ (g.) | $C_{16}$ component (g.) CHDT | $C_{16}$ component (g.) VCTT |
|---|---|---|---|---|---|---|---|---|---|---|
| 1 | $Ni(acac)_2$ (0.005) | $Et_3Al$ (0.005) | Allyl nickel chloride (0.005) | 120 | Toluene (150) | 50 | 24 | 30.2 | 5.6 | 1.1 |
| 2 | Same as above | i-$Bu_3Al$ (0.005) | do | 110 | do | 25 | 97 | 15.2 | 4.9 | 1.0 |
| 3 | do | $(cycloC_6H_{11})_3$-Al (0.005) | do | 110 | --- | 40 | 36 | 41.3 | 3.2 | 0.7 |
| 4 | $NiCl_2$ (0.005) | PhMgBr (0.01) | do | 110 | Ether (200) | 50 | 24 | 28.3 | 3.8 | 0.9 |
| 5 | $NiBr_2$ (0.005) | i-PrMgBr (0.01) | do | 126 | THF (200) | 50 | 24 | 37.2 | 4.2 | 1.3 |
| 6 | $C_3H_5NiCl$ (0.005) | $Et_2AlOEt$ (0.005) | do | 116 | Benzene (150) | 50 | 24 | 42.6 | 3.4 | 0.5 |
| 7 | $C_3H_5NiBr$ (0.005) | PhMgBr (0.005) | do | 110 | Toluene (150) | 40 | 36 | 15.2 | 2.8 | 0.4 |
| 8 | $NiCl_2$ (0.005) | $LiAlH_4$ (0.005) | do | 110 | THF (200) | 25 | 92 | 8.2 | 1.4 | 0.3 |
| 9 | Same as above | n-BuLi (0.005) | do | 119 | Ether (200) | 40 | 48 | 10.7 | 2.1 | 0.5 |
| 10 | do | Na (0.010) | do | 110 | do | 35 | 48 | 5.2 | 1.1 | 0.2 |
| 11 | $Ni(acac)_2$ (0.005) | $Et_2AlOEt$ (0.0010) | Allyl nickel bromide (0.005) | 98 | Toluene (150) | 40 | 39 | 23.8 | 1.0 | 0.2 |
| 12 | Same as above | i-$Bu_3Al$ (0.005) | do | 114 | do | 25 | 90 | 13.2 | 0.8 | 0.1 |
| 13 | do | $Et_2AlOEt$ (0.010) | Allyl nickel iodide (0.005) | 113 | do | 40 | 37 | 3.4 | 0.4 | 0.0 |
| 14 | do | Same as above | Allyl nickel fluoride (0.005) | 110 | do | 40 | 37 | 27.7 | 0.4 | 0.5 |

| System | $C_{20}$ component (g.) CECP | $C_{20}$ component (g.) VCOT | $C_{24}$ component (g.) CTCH | $C_{24}$ component (g.) VCDP | $C_{28}$ component (g.) COCH | $C_{28}$ component (g.) VCHH | $C_{32}$ component (g.) CDTO | $C_{32}$ component (g.) VCTH | $C_{36}$ component (g.) CHTN | $C_{36}$ component (g.) VCTO | Polymer (g.) Low | Polymer (g.) High | Conversion, percent | Yield of $C_{16}$-$C_{36}$, percent |
|---|---|---|---|---|---|---|---|---|---|---|---|---|---|---|
| 1 | 8.8 | 1.9 | 8.0 | 3.5 | 4.1 | 1.2 | 3.1 | 1.3 | 2.1 | 0.8 | 8.1 | 11.1 | 75.7 | 45.6 |
| 2 | 7.9 | 1.5 | 6.2 | 2.1 | 3.2 | 0.7 | 1.1 | 0.5 | 1.0 | 0.4 | 7.1 | 15.3 | 61.9 | 44.8 |
| 3 | 6.7 | 1.4 | 6.5 | 2.3 | 2.7 | 0.7 | 0.8 | 0.3 | 0.4 | 0.1 | 4.8 | 6.3 | 64.8 | 26.6 |
| 4 | 6.9 | 1.3 | 6.3 | 1.9 | 3.1 | 0.9 | 1.0 | 0.6 | 0.8 | 0.4 | 5.6 | 6.6 | 62.2 | 40.1 |
| 5 | 7.2 | 1.5 | 6.8 | 2.3 | 3.4 | 1.5 | 1.8 | 0.9 | 1.2 | 0.6 | 5.7 | 10.3 | 68.2 | 38.1 |
| 6 | 5.4 | 1.1 | 4.8 | 1.8 | 2.3 | 0.8 | 1.8 | 0.9 | 1.1 | 0.5 | 5.1 | 10.4 | 71.8 | 29.8 |
| 7 | 4.6 | 1.0 | 4.0 | 1.2 | 1.8 | 0.5 | 1.6 | 0.9 | 0.9 | 0.4 | 7.2 | 13.1 | 50.6 | 36.1 |
| 8 | 2.8 | 0.7 | 2.2 | 0.6 | 0.9 | 0.3 | 0.7 | 0.2 | 0.7 | 0.2 | 4.8 | 14.3 | 34.8 | 28.7 |
| 9 | 3.8 | 1.2 | 3.1 | 0.9 | 1.3 | 0.4 | 1.1 | 0.4 | 0.9 | 0.3 | 4.9 | 17.2 | 41.0 | 32.7 |
| 10 | 1.6 | 0.4 | 1.3 | 0.5 | 0.4 | 0.1 | 0.3 | 0.0 | 0.1 | 0.0 | 5.2 | 16.1 | 29.5 | 18.5 |
| 11 | 2.3 | 0.8 | 4.5 | 1.2 | 4.7 | 1.9 | 1.8 | 1.1 | 1.2 | 0.6 | 7.6 | 8.2 | 62.2 | 34.9 |
| 12 | 2.1 | 0.8 | 4.8 | 1.5 | 5.0 | 2.1 | 2.0 | 1.3 | 1.2 | 0.7 | 8.3 | 8.5 | 46.0 | 42.7 |
| 13 | 1.5 | 0.4 | 2.2 | 1.0 | 2.0 | 0.7 | 0.9 | 0.4 | 0.5 | 0.1 | 1.8 | 25.0 | 35.7 | 25.1 |
| 14 | 1.3 | 0.5 | 2.6 | 1.2 | 2.4 | 1.3 | 1.5 | 0.9 | 0.9 | 0.3 | 6.8 | 13.4 | 56.0 | 22.3 |

TABLE 7

| System | Nickel compound, mol | Organo aluminum compound or other reducing agent, mol | Organo halide, mol | Butadiene (g.) | Solvent (cc.) | Temp. (°C.) | Time (hr.) | $C_8$-$C_{12}$ (g.) | $C_{16}$ component (g.) CHDT | $C_{16}$ component (g.) VCTT |
|---|---|---|---|---|---|---|---|---|---|---|
| 1 | $Ni(acac)_2$ (0.01) | $Et_3Al$ (0.01) | Allyl chloride (0.005) | 145 | Toluene (200) | 25 | 92 | 17.3 | 6.1 | 1.2 |
| 2 | Same | i-$Bu_3Al$ (0.01) | do | 120 | do | 40 | 43 | 13.0 | 5.2 | 1.1 |
| 3 | do | $(cycloC_6H_{11})_3$-Al (0.01) | do | 129 | do | 40 | 41 | 15.9 | 5.8 | 1.4 |
| 4 | $NiCl_2$ (0.01) | PhMgBr (0.02) | Trityl chloride (0.005) | 169 | Ether (200) | 50 | 22 | 25.0 | 4.8 | 1.0 |
| 5 | $NiBr_2$ (0.01) | i-Ph MgBr (0.02) | Propargyl chloride (0.005) | 114 | do | 35 | 48 | 10.1 | 0.6 | 0.1 |
| 6 | $C_3H_5NiCl$ (0.01) | $Et_2AlOEt$ (0.01) | Methallyl chloride (0.005) | 119 | Benzene (150) | 25 | 91 | 12.1 | 3.6 | 0.9 |
| 7 | $C_3H_5NiBr$ (0.01) | PhMgI (0.01) | Allyl chloride (0.005) | 118 | Ether (200) | 25 | 89 | 9.6 | 2.1 | 0.7 |
| 8 | $NiCl_2$ (0.01) | $LiAlH_4$ (0.01) | do | 122 | THF (200) | 35 | 45 | 5.6 | 1.0 | 0.2 |
| 9 | Same | n-BuLi (0.01) | do | 113 | do | 40 | 39 | 7.2 | 2.1 | 0.8 |
| 10 | do | Na (0.02) | do | 109 | do | 50 | 24 | 3.2 | 0.8 | 0.2 |
| 11 | $Ni(acac)_2$ (0.01) | $Et_2AlOEt$ (0.02) | Allyl bromide (0.005) | 129 | Toluene (150) | 50 | 24 | 12.3 | 1.0 | 0.2 |
| 12 | Same | i-$Bu_3Al$ (0.01) | do | 114 | do | 40 | 35 | 10.2 | 0.7 | 0.1 |
| 13 | do | $Et_2AlOEt$ (0.02) | Allyl iodide (0.005) | 111 | do | 50 | 24 | 2.1 | 0.3 | 0.0 |
| 14 | do | Same | Allyl fluoride (0.005) | 111 | do | 50 | 24 | 13.2 | 0.9 | 0.6 |

TABLE 7—Continued

| System | C₂₀ component (g.) | | C₂₄ component (g.) | | C₂₈ component (g.) | | C₃₂ component (g.) | | C₃₆ component (g.) | | Polymer (g.) | | Conversion, percent | Yield of C₁₆–C₃₆, percent |
|---|---|---|---|---|---|---|---|---|---|---|---|---|---|---|
| | CECP | VCOT | CTCH | VCDP | COCH | VCHH | CDTO | VCTH | CHTN | VCTO | Low | High | | |
| 1 | 8.7 | 2.0 | 8.1 | 3.1 | 4.5 | 1.3 | 2.9 | 1.6 | 2.0 | 0.8 | 7.6 | 9.4 | 52.8 | 42.4 |
| 2 | 7.9 | 1.6 | 7.4 | 2.6 | 3.8 | 1.2 | 2.1 | 1.0 | 1.8 | 0.8 | 5.9 | 8.6 | 53.3 | 36.5 |
| 3 | 8.0 | 1.7 | 7.6 | 2.4 | 4.8 | 1.1 | 3.2 | 1.4 | 2.2 | 0.8 | 5.2 | 9.6 | 55.0 | 40.7 |
| 4 | 6.9 | 1.4 | 5.2 | 2.1 | 3.6 | 0.9 | 1.9 | 0.8 | 1.2 | 0.5 | 7.8 | 9.1 | 42.7 | 23.8 |
| 5 | 3.2 | 0.7 | 3.8 | 1.6 | 4.0 | 1.5 | 1.2 | 0.3 | 0.8 | 0.1 | 6.3 | 10.1 | 38.9 | 40.3 |
| 6 | 5.1 | 1.2 | 4.8 | 2.2 | 3.9 | 1.4 | 1.2 | 0.6 | 0.9 | 0.5 | 10.3 | 9.6 | 49.1 | 38.1 |
| 7 | 3.9 | 1.0 | 4.2 | 2.0 | 3.6 | 1.2 | 1.0 | 0.5 | 0.8 | 0.2 | 7.6 | 8.3 | 39.4 | 45.4 |
| 8 | 2.9 | 0.8 | 3.1 | 1.1 | 2.3 | 1.0 | 0.8 | 0.1 | 0.4 | 0.0 | 4.8 | 7.6 | 26.0 | 43.3 |
| 9 | 3.5 | 1.2 | 3.5 | 1.4 | 2.4 | 1.3 | 0.9 | 0.3 | 0.4 | 0.0 | 4.2 | 8.3 | 31.4 | 50.2 |
| 10 | 2.1 | 0.6 | 2.4 | 0.9 | 1.5 | 0.7 | 0.8 | 0.2 | 0.4 | 0.1 | 2.3 | 5.1 | 19.5 | 50.2 |
| 11 | 4.3 | 1.4 | 5.8 | 2.2 | 5.1 | 2.1 | 2.0 | 1.1 | 1.3 | 0.6 | 8.3 | 11.1 | 45.5 | 46.1 |
| 12 | 3.1 | 1.1 | 4.6 | 1.7 | 4.9 | 2.1 | 1.4 | 0.6 | 1.0 | 0.3 | 4.9 | 12.3 | 38.7 | 37.9 |
| 13 | 1.3 | 0.6 | 1.8 | 0.6 | 1.7 | 0.8 | 0.5 | 0.2 | 0.2 | 0.0 | 2.6 | 18.6 | 25.9 | 18.8 |
| 14 | 2.3 | 1.0 | 3.1 | 1.2 | 3.8 | 1.5 | 1.6 | 0.9 | 0.9 | 0.4 | 3.7 | 4.5 | 35.7 | 48.4 |

TABLE 8

| System | Halogenated "naked" nickel, mol | Amine, mol (g.) | Butadiene (g.) | Solvent (cc.) | Temp. (°C.) | Time (hr.) | C₈–C₁₂ (g.) | C₁₆ component (g.) | |
|---|---|---|---|---|---|---|---|---|---|
| | | | | | | | | CHDT | VCTT |
| 1 | Methallyl nickel chloride (0.01). | Methyl amine (0.02) | 121 | Chloro-benzene (100). | 40 | 24 | 8.7 | 3.2 | 0.5 |
| 2 | Allyl nickel bromide (0.01) | Ammonia (0.02) | 114 | Ether (150) | 40 | 36 | 8.3 | 0.9 | 0.1 |
| 3 | do | Hydroxyl amine (0.02). | 110 | Ether (100) | 40 | 48 | 5.2 | 0.3 | 0.0 |
| 4 | Allyl nickel chloride (0.01) | Methyl amine (0.02) | 123 | Chloro-benzene (100) | 40 | 24 | 4.3 | 0.9 | 0.2 |

| System | C₂₀ component (g.) | | C₂₄ component (g.) | | C₂₈ component (g.) | | C₃₂ component g(.) | | C₃₆ component (g.) | | Polymer (g.) | | Conversion, percent | Yield of C₁₆–C₃₆, percent |
|---|---|---|---|---|---|---|---|---|---|---|---|---|---|---|
| | CECP | VCOT | CTCH | VCDP | COCH | VCHH | CDTO | VCTH | CHTN | VCTO | Low | High | | |
| 1 | 4.7 | 1.0 | 4.2 | 1.6 | 2.3 | 0.8 | 1.3 | 0.8 | 0.9 | 0.3 | 3.1 | 3.3 | 30.3 | 58.8 |
| 2 | 1.3 | 0.3 | 3.3 | 1.2 | 3.1 | 1.6 | 1.2 | 0.4 | 0.5 | 0.2 | 2.3 | 4.4 | 25.6 | 48.4 |
| 3 | 0.9 | 0.2 | 2.7 | 1.1 | 2.3 | 1.1 | 0.7 | 0.3 | 0.3 | 0.1 | 1.9 | 6.8 | 21.4 | 41.1 |
| 4 | 2.1 | 0.7 | 1.8 | 0.8 | 1.2 | 0.6 | 0.8 | 0.2 | 0.6 | 0.1 | 2.1 | 6.2 | 18.3 | 44.0 |

TABLE 9

| System | "Naked" nickel, mol | Anhydrous nickel halide, mol | Butadiene (g.) | Solvent (cc.) | Temp. (°C.) | Time (hr.) | C₈–C₁₂ (g.) | C₁₆ component (g.) | |
|---|---|---|---|---|---|---|---|---|---|
| | | | | | | | | CHDT | VCTT |
| 1 | Dicyclo octadiene nickel (0.01). | NiCl₂ (0.0033) | 132 | THF (200) | 50 | 24 | 52.3 | 0.9 | 0.1 |
| 2 | Ditrityl nickel (0.01) | Same as above | 118 | Ether (100) | 50 | 24 | 61.8 | 0.6 | 0.1 |
| 3 | Diallyl nickel (0.01) | NiBr₂ (0.0033) | 126 | Toluene (200) | 50 | 24 | 70.2 | 0.3 | 0.0 |
| 4 | do | NiI₂ (0.0033) | 109 | do | 50 | 24 | 60.3 | 0.2 | 0.0 |
| 5 | do | NiF₂ (0.0033) | 110 | do | 50 | 24 | 68.8 | 0.3 | 0.2 |

| System | C₂₀ component (g.) | | C₂₄ component (g.) | | C₂₈ component (g.) | | C₃₂ component (g.) | | C₃₆ component (g.) | | Polymer (g.) | | Conversion, percent | Yield of C₁₆–C₃₆, percent |
|---|---|---|---|---|---|---|---|---|---|---|---|---|---|---|
| | CECP | VCOT | CTCH | VCDP | COCH | VCHH | CDTO | VCTH | CHTN | VCTO | Low | High | | |
| 1 | 2.1 | 0.7 | 1.8 | 0.4 | 0.9 | 0.2 | 0.6 | 0.2 | 0.3 | 0.0 | 1.8 | 4.6 | 53.0 | 12.7 |
| 2 | 1.8 | 0.6 | 1.6 | 0.3 | 0.7 | 0.1 | 0.3 | 0.0 | 0.1 | 0.0 | 1.2 | 2.3 | 60.7 | 8.4 |
| 3 | 1.0 | 0.2 | 2.8 | 1.2 | 2.1 | 0.9 | 1.3 | 0.6 | 0.3 | 0.2 | 3.2 | 5.6 | 71.7 | 12.6 |
| 4 | 0.7 | 0.1 | 1.7 | 0.8 | 1.2 | 0.4 | 0.5 | 0.1 | 0.3 | 0.0 | 1.2 | 8.7 | 70.0 | 7.9 |
| 5 | 1.3 | 0.4 | 0.9 | 0.2 | 0.7 | 0.2 | 0.4 | 0.0 | 0.1 | 0.0 | 1.8 | 1.7 | 70.0 | 6.1 |

TABLE 10

| System | Nickel halide, mol | Reducing agent, mol | Butadiene (g.) | Solvent (cc.) | Temp. (°C.) | Time (hr.) | C₈–C₁₂ (g.) | C₁₆ component (g.) | |
|---|---|---|---|---|---|---|---|---|---|
| | | | | | | | | CHDT | VCTT |
| 1 | NiCl₂ (0.01) | PhLi (0.015) | 114 | Ether (50) | 50 | 24 | 13.2 | 1.0 | 0.2 |
| 2 | Same as above | CH₃MeCl (0.015) | 123 | do | 40 | 36 | 7.2 | 0.6 | 0.1 |
| 3 | NiCl₂ (0.02) | Et₂AlOEt (0.03) | 132 | Toluene (200) | 35 | 47 | 27.2 | 1.9 | 0.3 |
| 4 | Same as above | Et₃Al (0.015) | 106 | Benzene (100) | 50 | 23 | 36.3 | 1.7 | 0.3 |
| 5 | NiCl₂ (0.01) | LiAlH₄ (0.008) | 118 | THF (50) | 30 | 65 | 5.4 | 0.5 | 0.1 |
| 6 | NiBr₂ (0.01) | n-BuLi (0.015) | 112 | Ether (50) | 25 | 39 | 13.2 | 0.6 | 0.1 |
| 7 | NiI₂ (0.01) | Same as above | 124 | do | 40 | 40 | 4.6 | 0.3 | 0.0 |
| 8 | NiF₂ (0.01) | do | 117 | do | 35 | 49 | 10.8 | 0.6 | 0.4 |
| 9 | C₃H₅NiCl (0.01) | n-CH₃Li (0.005) | 118 | do | 35 | 53 | 32.3 | 2.1 | 0.6 |
| 10 | C₃H₅NiBr (0.01) | n-BuLi (0.005) | 110 | do | 40 | 36 | 27.2 | 1.1 | 0.1 |
| 11 | C₃H₅NiI (0.01) | n-CH₃Li (0.005) | 128 | do | 40 | 36 | 7.6 | 0.4 | 0.0 |
| 12 | C₃H₅NiF (0.01) | Same as above | 135 | do | 40 | 36 | 35.7 | 1.2 | 1.0 |

| System | C₂₀ component (g.) | | C₂₄ component (g.) | | C₂₈ component (g.) | | C₃₂ component g.) | | C₃₆ component (g.) | | Polymer (g.) | | Conversion, percent | Yield of C₁₆–C₃₆, percent |
|---|---|---|---|---|---|---|---|---|---|---|---|---|---|---|
| | CECP | VCOT | CTCH | VCDP | COCH | VCHH | CDTO | VCTH | CHTN | VCTO | Low | High | | |
| 1 | 2.3 | 0.6 | 2.1 | 0.8 | 0.9 | 0.3 | 0.6 | 0.2 | 0.3 | 0.0 | 2.6 | 7.3 | 28.4 | 28.7 |
| 2 | 1.3 | 0.3 | 1.2 | 0.4 | 0.6 | 0.1 | 0.3 | 0.0 | 0.1 | 0.0 | 1.4 | 2.7 | 13.2 | 30.7 |
| 3 | 3.2 | 0.7 | 3.8 | 1.2 | 1.6 | 0.7 | 1.1 | 0.4 | 0.5 | 0.2 | 3.2 | 5.7 | 39.1 | 30.2 |
| 4 | 3.2 | 0.9 | 2.8 | 1.0 | 1.4 | 0.6 | 0.9 | 0.3 | 0.5 | 0.1 | 2.7 | 5.2 | 54.7 | 23.6 |
| 5 | 1.2 | 0.3 | 0.9 | 0.3 | 0.6 | 0.1 | 0.4 | 0.1 | 0.1 | 0.0 | 2.1 | 3.0 | 10.5 | 15.3 |
| 6 | 1.3 | 0.4 | 2.4 | 0.8 | 2.6 | 1.2 | 1.0 | 0.5 | 0.6 | 0.2 | 3.3 | 4.8 | 29.4 | 35.5 |
| 7 | 0.6 | 0.1 | 1.1 | 0.5 | 1.0 | 0.4 | 0.5 | 0.1 | 0.1 | 0.0 | 2.5 | 10.2 | 17.7 | 21.3 |
| 8 | 1.2 | 0.3 | 1.7 | 0.8 | 0.7 | 0.3 | 0.5 | 0.2 | 0.4 | 0.2 | 3.8 | 2.5 | 20.8 | 29.7 |
| 9 | 3.3 | 1.0 | 3.0 | 1.0 | 1.6 | 0.5 | 0.3 | 0.2 | 0.6 | 0.1 | 4.7 | 7.6 | 50.3 | 40.1 |
| 10 | 2.5 | 0.7 | 4.2 | 1.6 | 4.7 | 1.7 | 2.1 | 0.9 | 1.2 | 0.5 | 5.8 | 10.6 | 59.0 | 32.8 |
| 11 | 1.2 | 0.2 | 1.7 | 0.6 | 1.3 | 0.5 | 0.9 | 0.3 | 0.6 | 0.2 | 1.6 | 18.3 | 27.7 | 22.3 |
| 12 | 1.8 | 0.3 | 2.1 | 0.6 | 1.4 | 0.5 | 0.8 | 0.2 | 9.6 | 0.3 | 2.6 | 3.8 | 38.9 | 20.2 |

Having thus described our invention, we claim:
1. The large ring poly-ene compound of the formula

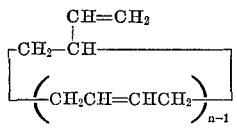

wherein $n$ is an integer from 4–9 and all double bonds within the ring are of a trans-configuration.

2. The process for the preparation of carbocyclic compounds which comprises the steps of reacting butadiene in the presence of a catalyst comprised of a mixture of a nickel-hydrocarbon ligand coordination complex and a halogenated nickel-hydrocarbon ligand coordination complex; said halogenated nickel-hydrocarbon coordination complex being present in an amount of from about 0.1 mol to about 10 mols per mol of said nickel-hydrocarbon ligand coordination complex; said nickel-hydrocarbon ligand coordination complex containing not more than 20 carbon atoms as the ligand; said process being conducted at a temperature between about 0° C. and about 100° C. whereby said carbocyclic compounds are obtained wherein all the double bonds within the ring of the carbocyclic compound are of a trans-configuration.

3. The compound 12-vinyl-1,5,9-cyclotetradecatriene, wherein all the double bonds within the ring of said compound are of a trans-configuration.

4. The compound 16-vinyl-1,5,9,13-cyclooctadecatetraene wherein all the double bonds within the ring of said compound are of a trans-configuration.

5. The compound 20-vinyl-1,5,9,13,17-cyclodocosapentaene wherein all the double bonds within the ring of said compound are of a trans-configuration.

6. The compound 24-vinyl-1,5,9,13,17,21-cyclohexacosahexaene wherein all the double bonds within the ring of said compound are of a trans-configuration.

7. The compound 28-vinyl-1,5,9,13,17,21,25-cyclotriacontaheptaene wherein all the double bonds within the ring of said compound are of a trans-configuration.

8. The compound 32-vinyl-1,5,9,13,17,21,25,29-cyclotetratriacontaoctaene wherein all the double bonds within the ring of said compound are of a trans-configuration.

References Cited

UNITED STATES PATENTS

| | | | |
|---|---|---|---|
| 3,439,057 | 4/1969 | Calderon | 260—666A |
| 3,422,128 | 1/1969 | Wilke | 260—439 |
| 3,148,224 | 9/1964 | Luttinger | 260—666B |
| 3,238,265 | 3/1966 | Mueller | 260—666B |
| 3,359,337 | 12/1967 | Rick | 260—666B |

FOREIGN PATENTS

| | | | |
|---|---|---|---|
| 1,050,333 | 2/1959 | Germany | 260—666B |
| 1,118,517 | 7/1968 | Great Britain | 260—666B |

OTHER REFERENCES

Hugh, W. B. Reed: J. Chem. Soc., 1954, p. 1934.

DELBERT E. GANTZ, Primary Examiner

V. O'KEEFE, Assistant Examiner

U.S. Cl. X.R.

260—666B